United States Patent
Gupta et al.

(10) Patent No.: US 10,091,275 B2
(45) Date of Patent: *Oct. 2, 2018

(54) MULTIPLE FILE DELIVERY OVER UNIDIRECTIONAL TRANSPORT PROTOCOL SESSIONS FOR A SERVICE

(71) Applicant: QUALCOMM Incorporated, San Diego, CA (US)

(72) Inventors: Chaitali Gupta, Sunnyvale, CA (US); Carlos Marcelo Dias Pazos, Carlsbad, CA (US); Nagaraju Naik, San Diego, CA (US); Ralph Akram Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,721

(22) Filed: Aug. 12, 2017

(65) Prior Publication Data

US 2017/0359405 A1 Dec. 14, 2017

Related U.S. Application Data

(63) Continuation of application No. 14/303,940, filed on Jun. 13, 2014, now Pat. No. 9,781,181.

(Continued)

(51) Int. Cl.
*H04L 29/08* (2006.01)
*H04L 29/06* (2006.01)
(Continued)

(52) U.S. Cl.
CPC .......... *H04L 67/06* (2013.01); *H04L 65/1066* (2013.01); *H04L 65/4007* (2013.01);
(Continued)

(58) Field of Classification Search
CPC ..... H04L 65/10; H04L 65/1066; H04L 65/40; H04L 65/4007; H04L 65/4015;
(Continued)

(56) References Cited

U.S. PATENT DOCUMENTS

| 8,351,363 B2 | 1/2013 | Bennett et al. |
| 9,331,800 B2 | 5/2016 | Walker et al. |

(Continued)

FOREIGN PATENT DOCUMENTS

| GB | 2406997 A | 4/2005 |
| WO | 2006090225 A1 | 8/2006 |

(Continued)

OTHER PUBLICATIONS

3GPP TS 26.346: 3rd Generation Partnership Project; Technical Specification Group Services and System Aspects; Multimedia Broadcast/Multicast Service (MBMS); Protocols and codecs (Release 11), V11.4.0 (Mar. 2013), Mar. 8, 2013, pp. 1-8, 18-22, 24-28, 36, 37, 48-51, 65-74, 114, 115, 121 (Sections 4.4, 5.2.2, 5.2.3, 5.6, 7.3, 8.3, 11.2A.1, 11.2B.2.), URL, http://www.3gpp.org/ftp/Specs/archive/26_series/26.346/26346-b40.zip.

(Continued)

*Primary Examiner* — Michael Won
*Assistant Examiner* — William C McBeth
(74) *Attorney, Agent, or Firm* — The Marbury Law Group

(57) ABSTRACT

Embodiment systems, methods, and devices enable data streams of a broadcast service to be carried in multiple communication sessions in any transport protocol providing file transport information and the transmission of objects, an example of which is File Delivery Over Unidirectional Transport ("FLUTE"). A session description may include a category attribute indicating the type of data carried in such a protocol session. A schedule fragment may include refer- (Continued)

ences to a session description for each such protocol session associated with a service. A common listing of configuration parameters may be generated for all such protocol sessions associated with a service. A different listing of configuration parameters may be generated for each such protocol session associated with a service. A flag setting in a diary file may indicate one or more such protocol session associated with a service over which in-band update fragments may be broadcast.

22 Claims, 26 Drawing Sheets

Related U.S. Application Data

(60) Provisional application No. 61/836,134, filed on Jun. 17, 2013.

(51) Int. Cl.
  *H04W 4/06* (2009.01)
  *H04W 72/00* (2009.01)
  *H04W 76/40* (2018.01)

(52) U.S. Cl.
  CPC .......... *H04L 65/4076* (2013.01); *H04W 4/06* (2013.01); *H04W 72/005* (2013.01); *H04W 76/40* (2018.02)

(58) Field of Classification Search
  CPC ............. H04L 65/4023; H04L 65/4069; H04L 65/4076; H04L 67/06; H04L 67/32; H04L 67/325; H04N 21/262; H04N 21/26283; H04W 4/06; H04W 72/005; H04W 72/12; H04W 72/1205; H04W 72/121; H04W 76/40
  See application file for complete search history.

(56) References Cited

U.S. PATENT DOCUMENTS

| | | | |
|---|---|---|---|
| 2005/0207415 | A1 | 9/2005 | Curcio et al. |
| 2006/0059267 | A1 | 3/2006 | Cugi et al. |
| 2006/0253560 | A1 | 11/2006 | Aaltonen |
| 2007/0086465 | A1 | 4/2007 | Paila et al. |
| 2007/0180133 | A1* | 8/2007 | Vedantham ......... H04L 65/4076 709/230 |
| 2009/0089535 | A1* | 4/2009 | Lohmar ................. H04L 67/06 711/173 |
| 2009/0264064 | A1 | 10/2009 | Hyun et al. |
| 2010/0180007 | A1* | 7/2010 | Suh ...................... H04N 21/235 709/217 |
| 2010/0302988 | A1 | 12/2010 | Becker |
| 2011/0165865 | A1 | 7/2011 | Gao et al. |
| 2011/0295978 | A1 | 12/2011 | Pazos et al. |
| 2013/0036234 | A1 | 2/2013 | Pazos et al. |
| 2013/0194996 | A1 | 8/2013 | Oyman |
| 2013/0301424 | A1 | 11/2013 | Kotecha et al. |
| 2014/0372570 | A1 | 12/2014 | Gupta et al. |
| 2014/0372624 | A1* | 12/2014 | Wang ..................... H04L 65/60 709/231 |
| 2015/0215670 | A1 | 7/2015 | Patel et al. |
| 2015/0286521 | A1* | 10/2015 | Long ................... H04L 12/1868 714/15 |

FOREIGN PATENT DOCUMENTS

| | | |
|---|---|---|
| WO | 2006110635 A1 | 10/2006 |
| WO | 2011066317 A1 | 6/2011 |
| WO | 2013053448 A1 | 4/2013 |

OTHER PUBLICATIONS

ATSC: "ATSC Recommended Practice: Guide to the ATSC Mobile DTV Standard", Jan. 30, 2013, Doc. A/154:2013, pp. 1-5, 60-62, 68-70, (Sections 8.4 and 10), URL, https://www.atsc.org/wp-content/uploads/2015/03/Guide-to-the-ATSC-mobile-dtv.pdf.
3rd Generation Partnership Project; Technical Specification Group Services and System Aspects; Multimedia Broadcast/Multicast Service (MBMS); Protocols and codecs (Release 11), 3GPP Standard; 3gpp TS 26.346, 3rd Generation Partnership Project (3GPP), Mobile Competence Centre; 650, Route Des Lucioles; F-06921 Sophia-Antipolis Cedex ; France, vol. SA WG4, No. V11.2.0, Sep. 13, 2012, pp. 1-158, XP050649333, [retrieved on Sep. 13, 2012].
Ericsson: "Flute on Unicast", 3GPP Draft; S4-060664_FLUTEONUNICAST_PAI, 3rd Generation Partnership Project (3GPP), Mobile Competence Centre; 650, Route Des Lucioles ; F-06921 Sophia-Antipolis Cedex; France,vol. SA WG4, No. Athens, Greece; Oct. 31, 2006, Oct. 31, 2006 (Oct. 31, 2006), XP050288963.
Hartung et al., "Delivery of Broadcast Services in 3G Networks," IEEE Transactions on Broadcasting, Mar. 2007, vol. 53(1), pp. 188-199.
Hartung, F. et al., "MBMS-IP Multicast/Broadcast in 3G Networks", International Journal of Digital Multimedia Broadcasting, Jan. 1, 2009, pp. 1-25, vol. 2009, XP55035073, ISSN: 1687-7578, DOI: 10.1155/2009/597848.
International Search Report and Written Opinion—PCT/US2014/042515—ISA/EPO—dated Sep. 23, 2014.
Knappmeyer et al.,"Advanced Multicast and Broadcast Content Distribution in Mobile Cellular Networks," IEEE Global Telecommuncations Conference, 2007, Nov. 26-30, 2007, pp. 2097-2101.
Lecompte D., et al, "Evolved Multimedia Broadcast/Multicast Service (eMBMS) in LTE-Advanced: Overview and Rel-11 Enhancements", IEEE Communications Magazine, vol. 50, No. 11, Nov. 30, 2012 (Nov. 30, 2012), pp. 68-74, XP055135288, ISSN: 0163-6804, DOI: 10.1109/MCOM.2012.6353684, Chapter eMBMS Quality of Service.
Lohmar, T. et al., "Scalable push file delivery with MBMS", Ericsson Review (Incl. On), Telefonaktiebolaget LM Ericsson, No. 1, Jan. 1, 2009, pp. 12-16, XP001554044, ISSN: 0014-0171.
Walsh R., "SDP Descriptors for Flute; draft-mehta-rmt-flute-sdp-06.txt", Internet Engineering Task Force, IETF; Standardworkingdraft, Internet Society (ISOC) 4, Rue Des Falaises Ch- 1205 Geneva, Switzerland, No. 6, Jul. 1, 2010 (Jul. 1, 2010), pp. 1-31, XP015069233.
Xylomenos et al., "The multimedia Broadcast/multicast Service," Wireless Communications and Mobile Computing, Mar. 2008, vol. 8(2), pp. 255-265.

\* cited by examiner

MULTIPLE FILE DELIVERY OVER UNIDIRECTIONAL TRANSPORT PROTOCOL SESSIONS FOR A SERVICE

RELATED APPLICATIONS

This application is a continuation of, and claims the benefit of priority to, U.S. Non-Provisional patent application Ser. No. 14/303,940 entitled "Multiple File Delivery Over Unidirectional Transport Protocol Sessions For A Service" filed Jun. 13, 2014 which claims the benefit of priority to U.S. Provisional Patent Application No. 61/836,134 entitled "Multiple File Delivery Over Unidirectional Transport Protocol Sessions For A Service" filed Jun. 17, 2013, the entire contents of both of which are hereby incorporated by reference.

BACKGROUND

In current evolved Multimedia Broadcast/Multicast Service ("eMBMS") networks established according to the 3rd Generation Partnership Projects ("3GPP") Technical Standard ("TS") 26.346 Release 11 (the entire contents of which are hereby incorporated by reference) generally only one File Delivery Over Unidirectional Transport ("FLUTE")(as described in Internet Engineering Task Force ("IETF") Request For Comments ("RFC") 6726, the entire contents of which are hereby incorporated by reference) session is assigned for each service.

A one FLUTE session to one service correspondence can present challenges, such as challenges in applying forward error correction, content scheduling complications in network infrastructure, encoder requirements to support multiplexed representations, etc., in scenarios in which services include two or more data streams. Additionally, if multiple FLUTE sessions are generated for a service, current systems present challenges in identifying which type of content for a service is associated with which FLUTE session of the multiple FLUTE sessions.

One example of a scenario in which a service includes two or more data streams is a multimedia streaming service including one or more audio streams and one or more video streams. Another example of a scenario in which a service includes two or more data streams is a Dynamic Adaptive Streaming over HTTP ("DASH") service including multiple video streams each associated with different camera angle views, multiple audio streams each associated with different languages, and multiple timed-text streams each associated with different languages. A further example of a scenario in which a service includes two or more data streams is a real time streaming service providing non-real time ("NRT") data with the real time stream, such as a live sporting event service in which a real time video stream, real time audio stream, and non-real time sports statistics are provided or a live music concert in which a real time video stream, real time audio stream, and non-real time artist information and upcoming tour calendars are provided. Approaches to provide the data associated with services including two or more data streams via a single FLUTE session—such as multiplexing, interleaving, file bundling, and file repetition—present challenges, such as challenges in applying forward error correction, content scheduling complications in network infrastructure, encoder requirements to support multiplexed DASH representations, etc.

SUMMARY

The systems, methods, and devices of the various embodiments enable data streams of a broadcast service to be carried in multiple sessions in a protocol providing file transport information and the transmission of objects, an example of which is File Delivery Over Unidirectional Transport ("FLUTE"). In various embodiments, a type of data carried in such a protocol session may be indicated by a diary file associated with the service. In an embodiment, a session description may include a category attribute indicating the type of data carried in such a protocol session. In an embodiment, a schedule fragment may include a session description for each session associated with a service. In an embodiment, a common listing of configuration parameters may be generated for all sessions associated with a service. In another embodiment, a different listing of configuration parameters may be generated for each such protocol session associated with a service. In an embodiment, a flag setting in a diary file may indicate one or more such protocol sessions associated with a service over which in-band update fragments may be broadcast.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
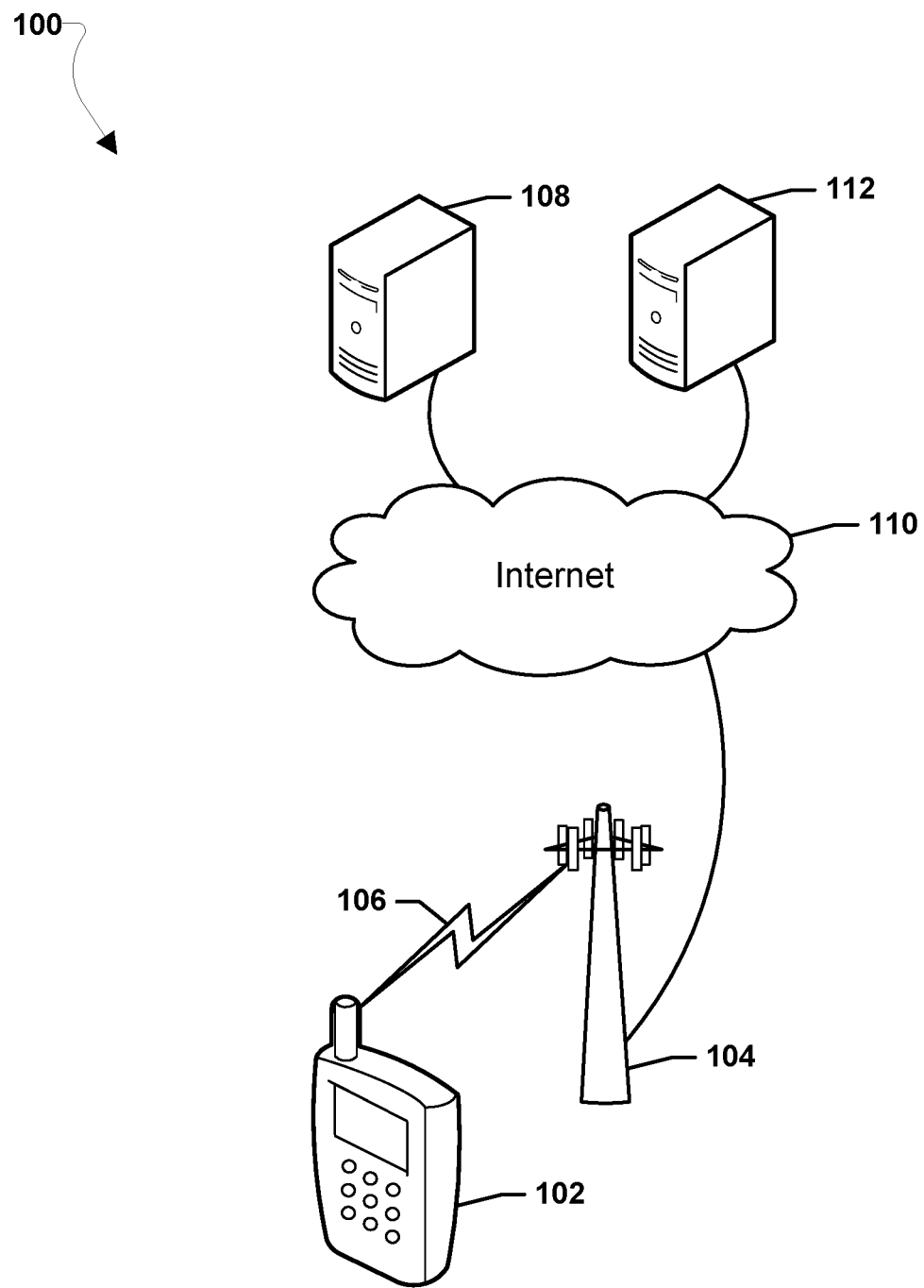
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for receiving broadcast services.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein In evolved Multimedia Broadcast/Multicast Service ("eMBMS") networks, such as a Long Term Evolution ("LTE") network, established according to the 3rd Generation Partnership Projects ("3GPP") Technical Standard ("TS") 26.346 Release 11 two types of broadcast services may be provided, streaming services (e.g., Real-time Transport Protocol ("RTP") based) and file delivery services (e.g., FLUTE based). The file delivery services may rely on the FLUTE protocol for the transport of file objects and a file-based streaming service may be defined using FLUTE. Additionally, eMBMS networks, such as a LTE network established according to the 3GPP TS 26.346 Release 11, may use Dynamic Adaptive Streaming over HTTP ("DASH") as a file-based streaming service. A file-based streaming service may include two or more media streams. One example of a scenario in which a service includes two or more media streams is a file-based streaming service, such as a DASH service, including one or more audio streams and one or more video streams. Another example of a scenario in which a service includes two or more data streams is a DASH service including multiple video streams each associated with different camera angle views, multiple audio streams each associated with different languages, and multiple timed-text streams each associated with different languages. A further example of a scenario in which a service includes two or more data streams is a real time streaming service providing non-real time ("NRT") data with the real time stream, such as a live sporting event service in which a real time video stream, real time audio stream, and non-real time sports statistics are provided or a live music concert in which a real time video stream, real time audio stream, and non-real time artist information and upcoming tour calendars are provided. As still another example, a file service may include files of two or more different content types, each different content type representing its own data stream.

In simple eMBMS networks, each service is carried over only one File Delivery Over Unidirectional Transport ("FLUTE") session, as described in Internet Engineering Task Force ("IETF" Request For Comments ("RFC") 6726). In scenarios in which services include two or more data streams, a one-FLUTE-session-to-one-service correspondence presents challenges, such as challenges in applying forward error correction, content scheduling challenges adding network complexity, challenges in encoder complexity to multiplex multiple media streams in the same file, etc. Additionally, even in scenarios in which multiple FLUTE sessions are generated for a service, current eMBMS networks preset challenges in identifying which type of content for a service is associated with which FLUTE session of the multiple FLUTE sessions. Identifying which FLUTE session carries which media stream may be important for receiver devices to enable the receiver devices to select which media stream to receive from the multiple FLUTE sessions and thereby conserve battery life by not wasting power joining FLUTE sessions for unneeded media streams. Further, in scenarios in which NRT files may be sent on different FLUTE sessions of the multiple FLUTE sessions, current systems present challenges in identifying which FLUTE session NRT files may be sent on.

The various embodiments may be implemented in any protocol providing file transport information (e.g., a file delivery table) and the transmission of objects (e.g., file objects), an example of which is FLUTE. Since FLUTE provides an example of such a protocol, the various embodiments are described with reference to FLUTE. However, while the various embodiments and examples are discussed herein as using FLUTE as a transport protocol for data streams of a broadcast service, the discussions of FLUTE are used merely as examples to better illustrate the aspects of the various embodiments, and are not intended to limit the claims. Other transport protocols, such as any transport protocol providing file transport information and enabling the transmission of objects, may be used with the various embodiments, and the transport protocols may be substituted in the various examples and embodiments without departing from the spirit or scope of the invention.

The systems, methods, and devices of the various embodiments enable data streams of a broadcast service to be carried in multiple FLUTE sessions. A broadcast service including two or more data streams may be scheduled for broadcast via two or more FLUTE sessions. In an embodiment, each data stream of a broadcast service may be broadcast via its own respective FLUTE session. As an example, the broadcast service may include a video data stream and an audio data stream. The video data stream may be broadcast in a first FLUTE session and the audio data stream may be broadcast in a second FLUTE session. As another example, the broadcast service may include multiple video data streams and an audio data stream. Each of the multiple video data streams may be broadcast in its own respective FLUTE session and the audio data stream may be broadcast in an additional FLUTE session. In another embodiment, two or more data streams of the broadcast service may be broadcast in the same FLUTE session, while a different data stream of the broadcast service may be broadcast in an additional FLUTE session. As an example, a first FLUTE session may carry a video and an audio stream of the broadcast service while a second FLUTE session carries file contents associated with non-real time ("NRT") data for the broadcast service.

The various embodiments may enable a receiver device to determine the type of data carried in each data stream of a service broadcast via multiple FLUTE sessions and/or the type of data associated with each FLUTE session. In an embodiment, a type of data carried in a FLUTE session of a service broadcast via multiple FLUTE sessions may be indicated by a diary file associated with the service. The diary file may be provided to the receiver device. A diary file may be any type of data structure that indicates information (e.g., transport schedule information) associated with a broadcast service. As examples, a diary file may be a service discovery file, a session announcement, a schedule fragment (e.g., a service schedule fragment), a user service description (e.g., a "USD"), etc. As an additional example, a diary file may be a file including a service discovery file, a session announcement, a schedule fragment (e.g., a service schedule fragment), a user service description (e.g., a "USD"), etc., along with other information.

In an embodiment, the receiver device may use the diary file to determine the type of data carried in each data stream of a service broadcast via multiple FLUTE sessions and/or the type of data associated with each FLUTE session. In an embodiment, the receiver device may join all the FLUTE sessions associated with a service broadcast via multiple FLUTE sessions to receive data for all data streams of the service. The receiver may selectively render the received data to render one or more of the data streams of the service. As an example, a service may be broadcast with a video stream in a first FLUTE session, an English language audio stream in a second FLUTE session, and a Spanish language audio stream in a third FLUTE session. The receiver device may join the first, second, and third FLUTE session and receive all three data streams, but based on a user selection indication for Spanish language output, may only render the video stream received via the first FLUTE session and the Spanish language audio stream received via the third FLUTE session.

In an embodiment, the receiver device may determine which data stream(s) to render based on the data of the data streams indicated in a diary file. In a further embodiment, all data streams may be initially presented to a user, and based on usage patterns, the FLUTE session(s) for the unused data stream(s) may be closed. In another embodiment, the receiver device may determine which data stream(s) to consume and render, and the receiver device may join only those FLUTE sessions associated with a service broadcast via multiple FLUTE sessions that are associated with the data stream(s) to be rendered. The FLUTE sessions for data stream(s) not selected for consumption may be kept inactive. The receiver may render the received data to render the determined data stream(s) of the service. As an example, a service schedule may indicate a service may be broadcast with a video stream in a first FLUTE session, an English language audio stream in a second FLUTE session, and a Spanish language audio stream in a third FLUTE session. Based at least in part on a user preference setting for Spanish language audio and the diary file, the receiver device may determine the video stream and the Spanish language audio stream should be rendered and the receiver device may join the first and third FLUTE session to receive the video stream and Spanish language audio stream. The receiver device may render the video stream received via the first FLUTE session and the Spanish language audio stream received via the third FLUTE session.

In an embodiment, a session description, such as a session description (e.g., a "SDP") established according to the Session Description Protocol as described in IETF RFC 4566 (the entire contents of which are hereby incorporated by reference), may indicate the data type of the data carried in each of the multiple FLUTE sessions associated with a service. In an embodiment, each FLUTE session may be described by its own session description, each session description providing the source address and transport session identifier (e.g., a "TSI") for the FLUTE session. In an embodiment, attributes of the session description may indicate the type of data carried in the FLUTE session. In an embodiment, a category attribute included in the session description may indicate the type of data carried in the FLUTE session and the category attribute may be used to select one or more of the multiple FLUTE sessions associated with a service. In another embodiment, the media attribute of the session description may indicate the type of data carried in the FLUTE session. In further embodiments, other attributes of the session description, such as a keyword attribute or language attribute, may indicate the type of data carried in a FLUTE session and these other attributes may be used to select one or more of the multiple FLUTE sessions associated with a service. In an embodiment, an attribute of a session description may be defined by one or more tags, such as a category tag, indicating the type of data carried in the FLUTE session. As examples, a category tag indicated in a category attribute of a session description (e.g., a SDP) may be "streaming.av" indicating streaming audio and video, "streaming.tt" indicating a stream with timed-text, "application.statistics" indicating a stream with statistics, "application.info" indicating a stream with information (e.g., concert information), etc.

In an embodiment, a session description indicating the type of data broadcast in the multiple FLUTE sessions associated with a service may be sent as part of a service announcement. For example, an address (e.g., a Uniform Resource Identifier "URI") corresponding to the session description may be indicated in the delivery method for a service. In this manner, a receiver device receiving the service announcement may identify and/or retrieve the session description from the address indicated in the delivery method. As a specific example, a diary file may be, or may include, a service schedule fragment with transport schedule information for a first FLUTE session and a second FLUTE session and the indication of the session description for a first FLUTE session and a second FLUTE session may identify a component of the transport schedule information that describes transmissions on either of the first FLUTE session or the second FLUTE session. The indication of the session description for the first FLUTE session may be an indication of a first session description URI, a first source Internet Protocol ("IP") address, or a first TSI associated with the first FLUTE session and an indication of a second session description URI, a second source IP address, or a second TSI associated with the second FLUTE session. The type of data in the first data stream may be indicated by a first category attribute indicated in the service schedule fragment and the type of data in the second data stream may be indicated by a second category attribute indicated in the service schedule fragment.

In a further embodiment, the type of data broadcast in the multiple FLUTE sessions associated with a service may be indicated in a service filter, such as a service feature filter. As an example, a filter tag and an associated filter rule (or filtering rules) including a category tag may be present in the service feature filter, and a filter tag in a delivery method may refer back to the filter rule and identifying category tag for the service. In another embodiment, the type of data broadcast in the multiple FLUTE sessions associated with a service may be indicated in service description metadata of a user service description (e.g., a USD) and references in a delivery method to a category tag indicating the data type of the user service description. In an embodiment, the type of data broadcast in the multiple FLUTE sessions may be indicated by including a category tag of a service directly in the filter description metadata. In another embodiment, the type of data broadcast in the multiple FLUTE sessions may be indicated by providing a category tag for each FLUTE session defined in the delivery method of a service definition.

Configuration parameters may be parameters associated with configuring a service and/or transport session associated with a service, such as file repair parameters, reception reporting parameters, etc. In an embodiment, each FLUTE session for a service may have the same configuration parameters, and a common listing of configuration parameters may be generated for all FLUTE sessions associated with the service. As an example, the FLUTE sessions may both have the same reporting type, such as "start-only", and one common listing of configuration parameters, such as an associated delivery procedure description (e.g., an "ADPD") fragment may be generated. The common associated delivery procedure description may be referenced in the delivery method for each FLUTE session. In another embodiment, FLUTE sessions for a service may have different configuration parameters, and a different listing of configuration parameters may be generated for each FLUTE session associated with the service. As an example, one FLUTE session for a service may have one reporting type, such as "start-only", and another FLUTE session may have a different reporting type, such as "start-all" as well as additional forward error correction ("FEC") parameters. A different listing of configuration parameters, such as a different associated delivery procedure description fragment may be generated for the different FLUTE sessions. The respective different associated delivery procedure descriptions may be indicated in the respective delivery methods for each FLUTE session. As an example, the respective Uniform Resource Identifier ("URI") of each different associated delivery procedure description may be referenced in the respective delivery methods for each FLUTE session. In an embodiment, the receiver device receiving multiple associated delivery procedure descriptions and joining multiple FLUTE sessions may aggregate reception reports on a per service basis, and send an aggregated reception report for all FLUTE sessions. The reception report may differentiate statistics on a per FLUTE session basis. As an example, a FLUTE session ID for each FLUTE session may be included in the statistical report of a reception report input message. In an embodiment, the back off period associated with the aggregated reception report may be set from the end of the largest FLUTE session associated with the service. In another embodiment, the back off period associated with the aggregated reception report may be set from the end of the latest active FLUTE session associated with the service In an embodiment, in-band update fragments (e.g., update metadata fragments) may be provided in one or more FLUTE sessions. As examples, in-band update fragments (e.g., update metadata fragments) may include schedule updates, associated delivery procedure description updates (e.g., ADPD updates), media presentation description updates (e.g., DASH media presentation description "MPD" updates), etc. In an embodiment, all in-band update fragments for a service may be provided in every FLUTE session for a service. In another embodiment, only those in-band update fragments applicable to a respective FLUTE session or data stream of a FLUTE session may be provided in each respective FLUTE session. In an embodiment, a main component data stream of a service may be determined, and all in-band update fragments for all data streams and FLUTE sessions of the service may be provided in the FLUTE session associated with the data stream determined to be the main component. As an example, in a service with multiple video data streams and only a single audio data stream, the audio data stream may be selected as the main component because it may be joined by a receiver device regardless of the video data stream selected for rendering by the receiver device. As the audio stream is the main component, the FLUTE session for the audio stream may carry all the in-band update fragments for the service.

In an embodiment, a flag setting in a diary file may indicate one or more FLUTE sessions associated with a service over which in-band update fragments may be broadcast. As an example, a flag setting in delivery method of a service definition may indicate one or more FLUTE sessions associated with a service over which in-band update fragments may be broadcast. In this manner, a receiver device may identify which FLUTE session(s) may carry in-band update fragments. In an embodiment, the receiver device may join the FLUTE session(s) carrying in-band updates regardless of whether the data stream for the service carried in the FLUTE session(s) is selected to be consumed by the receiver device.

Systems, methods, and devices of the various embodiments may enable, generating a schedule for a service including two or more data streams such that a first data stream of the service is scheduled to be broadcast in a first transport session of a protocol providing file transport information, such as a file delivery table, and transmission of objects, such as file objects, and a second data stream of the service is scheduled to be broadcast in a second transport session of the protocol, generating a diary file associated with the service, wherein the diary file indicates the service, the first transport session and a type of data in the first data stream, the second transport session and a type of data in the second data stream, and a session description for the first transport session and the second transport session, sending the diary file from a server to a receiver device, and broadcasting the service in the first transport session and the second transport session in the cellular network according to the schedule.

FIG. 1 illustrates a cellular network system 100 suitable for use with the various embodiments. The cellular network system 100 may include multiple devices, such as a receiver device 102, one or more cellular towers or base stations 104, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router that may connect to the Internet 110. In this manner, via the connections to the cellular tower or base station 104, and/or Internet 110, data may be exchanged between the receiver device 102 and the server(s) 108 and 112. In an embodiment, server 108 may be a broadcast network operator server controlling the operations of the cellular network 100 including the receiver device 102 and the cellular tower or base station 104 and the provisioning of services to the receiver device 102 from the content server 112.

Figure 2:
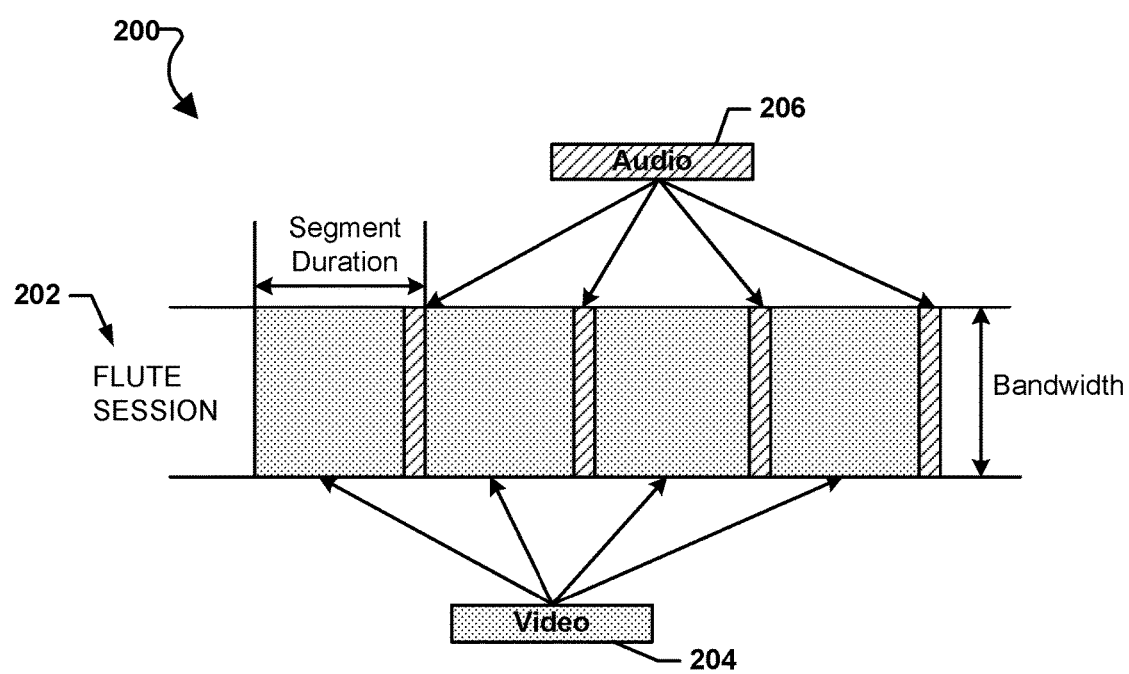
FIG. 2 is a timeline diagram illustrating interleaving of audio and video data segments in a prior art broadcast service.

FIG. 2 illustrates a current transport scheme for a broadcast service 200. In current eMBMS networks, such as a LTE network, established according to the 3GPP TS 26.346 Release 11, a service 200 may include two or more data streams, such as a video data stream 204 comprised of video files and an audio data stream 206 comprised of audio files. In current eMBMS networks, though there may be two or more data streams, the two or more data streams are broadcast in only one FLUTE session 202. Various different approaches may be used to provide the data associated with service 200 including via the single FLUTE session, such as multiplexing, interleaving, file bundling, and file repetition. FIG. 2 illustrates an example method of broadcasting the video data stream 204 and the audio data stream 206 of the service 200 in a single FLUTE session 202 by combining the video data stream 204 with the files of the audio data stream 206. The current approaches used to provide the data associated with service 200 via the single FLUTE session present challenges, such as challenges in applying FEC, content scheduling complications in network infrastructure, encoder requirements to support multiplexed DASH representations, etc. For example, FEC may be applied on a per FLUTE session basis, and the amount of FEC overhead may not be appropriate for files of different sizes transported over the single FLUTE session 202.

Figure 3:
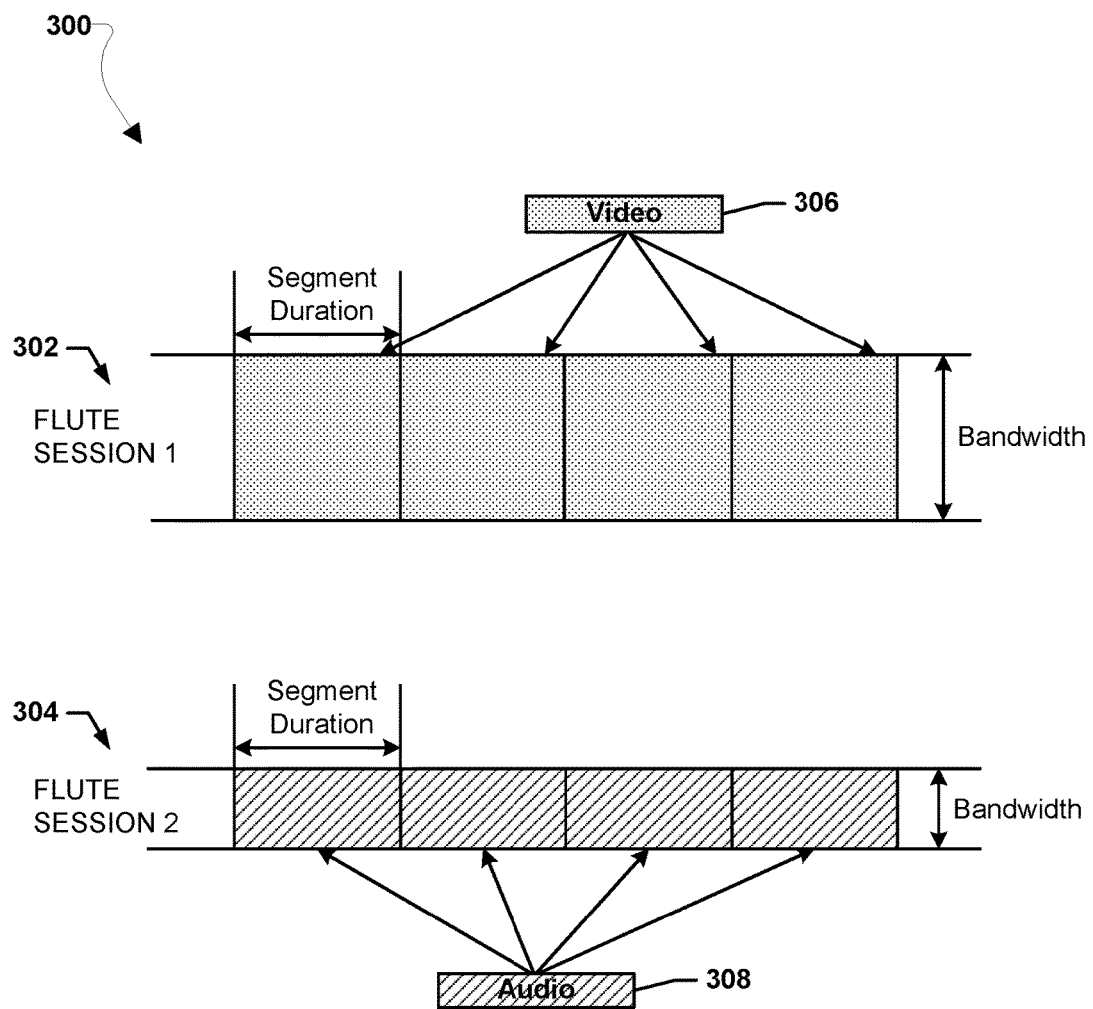
FIG. 3 is a timeline diagram illustrating audio and video content allocations across FLUTE sessions according to an embodiment.

The systems, methods, and devices of the various embodiments enable data streams of a broadcast service to be carried in multiple FLUTE sessions. FIG. 3 illustrates an embodiment transport scheme in which multiple FLUTE sessions 302, 304, are provided for a service 300. As an example, the service 300 may be a streaming service of an eMBMS network, such as an LTE network. The service 300 may include two data streams, 306 and 308, each comprised of different types of data. As an example, a first data stream 306 may be a video data stream comprised of video files and a second data stream 308 may be an audio stream comprised of audio files. The first data stream 306 and the second data stream 308 may be broadcast in their own respective FLUTE sessions 302 and 304. In this manner, a receiver device may join the FLUTE session 302 to receive the first data stream 306 and/or join the FLUTE session 304 to receive the second data stream 308. In an embodiment, a diary file, such as a service discovery file, provided to the receiver device may indicate the service 300, the FLUTE session 302 and a type of data in the first data stream 306, the FLUTE session 304 and a type of data in the second data stream 308, and/or schedule descriptions associated with FLUTE sessions 302 and/or 304.

Figure 4:
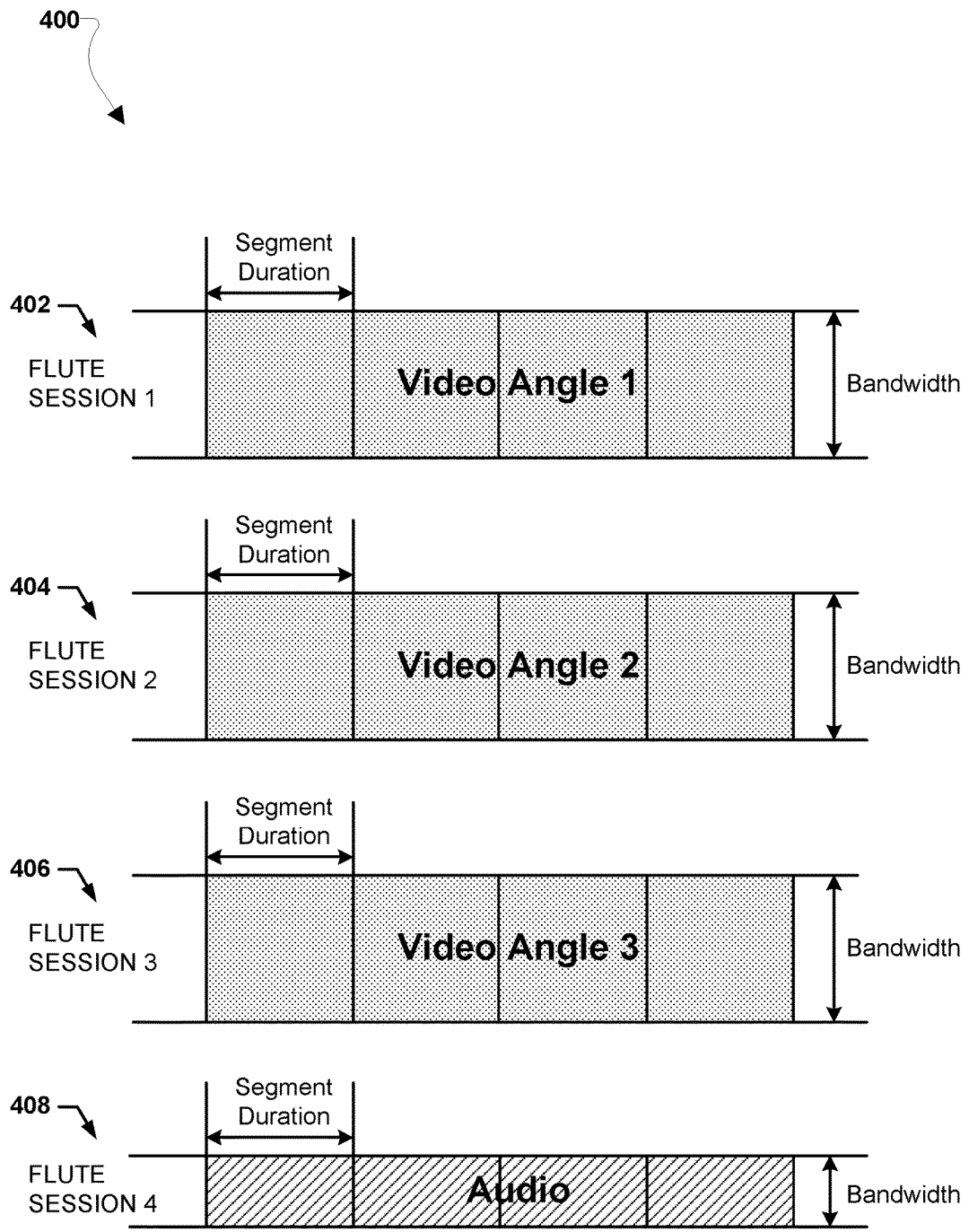
FIG. 4 is a timeline diagram illustrating audio and video content allocations across FLUTE sessions according to another embodiment.

FIG. 4 illustrates another embodiment transport scheme in which multiple FLUTE sessions 402, 404, 406, and 408 are provided for a service 400. As an example, the service 400 may be a streaming service of an eMBMS network, such as an LTE network. The service 400 may include four data streams each comprised of different types of data. As an example, three different video data streams, VideoAngle1, VideoAngle2, and VideoAngle3, each carrying a different camera view of a live sporting event, and an audio stream, Audio, may be associated with the service 400. The data stream VideoAngle1 may be carried in FLUTE session 402, the data stream VideoAngle2 may be carried in FLUTE session 404, the data stream VideoAngle3 may be carried in FLUTE session 406, and the data stream Audio may be carried in FLUTE session 408. In this manner, a receiver device may join the FLUTE sessions 402, 404, 406, and/or 408 to receive the data streams VideoAngle1, VideoAngle2, VideoAngle3, and/or Audio of the service 400. In an embodiment, the receiver device may join all the FLUTE sessions 402, 404, 406, and 408, and may select which data streams to render independent of joining the FLUTE sessions 402, 404, 406, and 408. In another embodiment, the receiver device may determine which data streams VideoAngle1, VideoAngle2, VideoAngle3, and/or Audio of the service 400 to render, and join FLUTE sessions for any data streams VideoAngle1, VideoAngle2, VideoAngle3, and/or Audio to be rendered. In an embodiment, a diary file, such as a service discovery file, provided to the receiver device may indicate the service 400, the FLUTE sessions 402, 404, 406, 408, the data streams VideoAngle1, VideoAngle2, VideoAngle3, Audio, type of data in each data stream VideoAngle1, VideoAngle2, VideoAngle3, and/or Audio, and/or schedule descriptions for the FLUTE sessions 402, 404, 406, and/or 408.

Figure 5:
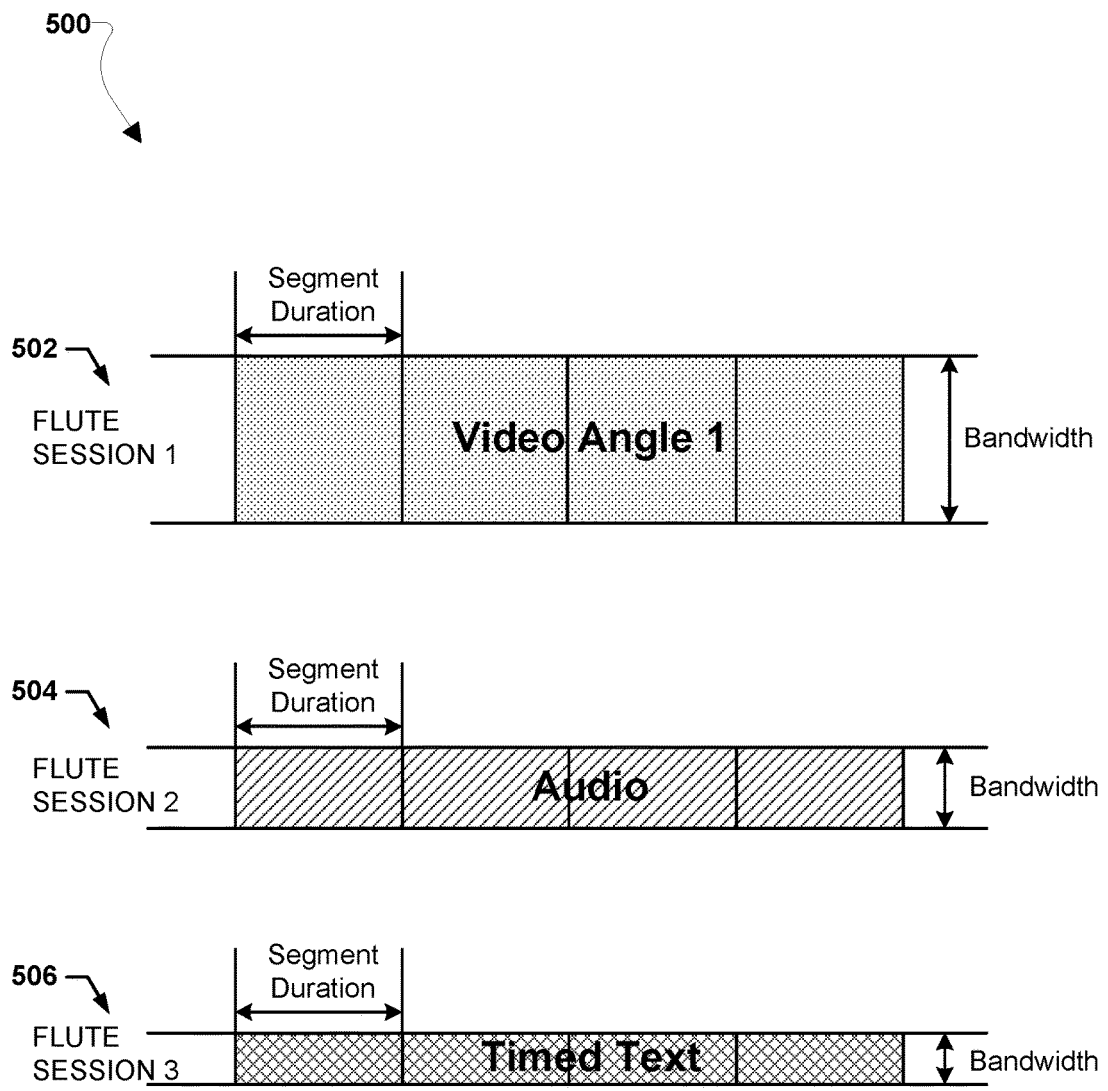
FIG. 5 is a timeline diagram illustrating audio, video, and timed-text content allocations across FLUTE sessions according to a third embodiment.

FIG. 5 illustrates another embodiment transport scheme in which multiple FLUTE sessions 502, 504, and 506, are provided for a service 500. As an example, the service 500 may be a streaming service of an eMBMS network, such as an LTE network. The service 500 may include three data streams VideoAngle1, Audio, and Timed Text. As an example, data stream VideoAngle1 may be a video data stream comprised of video files, data stream Audio may be an audio video stream comprised of audio files, and data stream Timed Text may be a text stream comprised of files providing text data related to the video stream, such as information about upcoming concert dates of an artist featured in a concert video stream. The data stream VideoAngle1 may be broadcast in FLUTE session 502, the data stream Audio may be broadcast in FLUTE session 504, and the data stream Timed Text may be broadcast in FLUTE session 506.

In an embodiment, a receiver device may join all the FLUTE sessions 502, 504, and 506, and may select which data streams to render independent of joining the FLUTE sessions 502, 504, and 506.

In another embodiment, a receiver device may determine which data streams VideoAngle1, Audio, and/or Timed Text of the service 500 to render, and join FLUTE sessions for any data streams VideoAngle1, Audio, and/or Timed Text to be rendered.

In an embodiment, a diary file, such as a service discovery file, provided to the receiver device may indicate the service 500, the FLUTE sessions 502, 504, 506, the data streams VideoAngle1, Audio, and/or Timed Text, type of data in each data stream VideoAngle1, Audio, and/or Timed Text, and/or schedule descriptions for the FLUTE sessions 502, 504, and/or 506.

Figure 6:
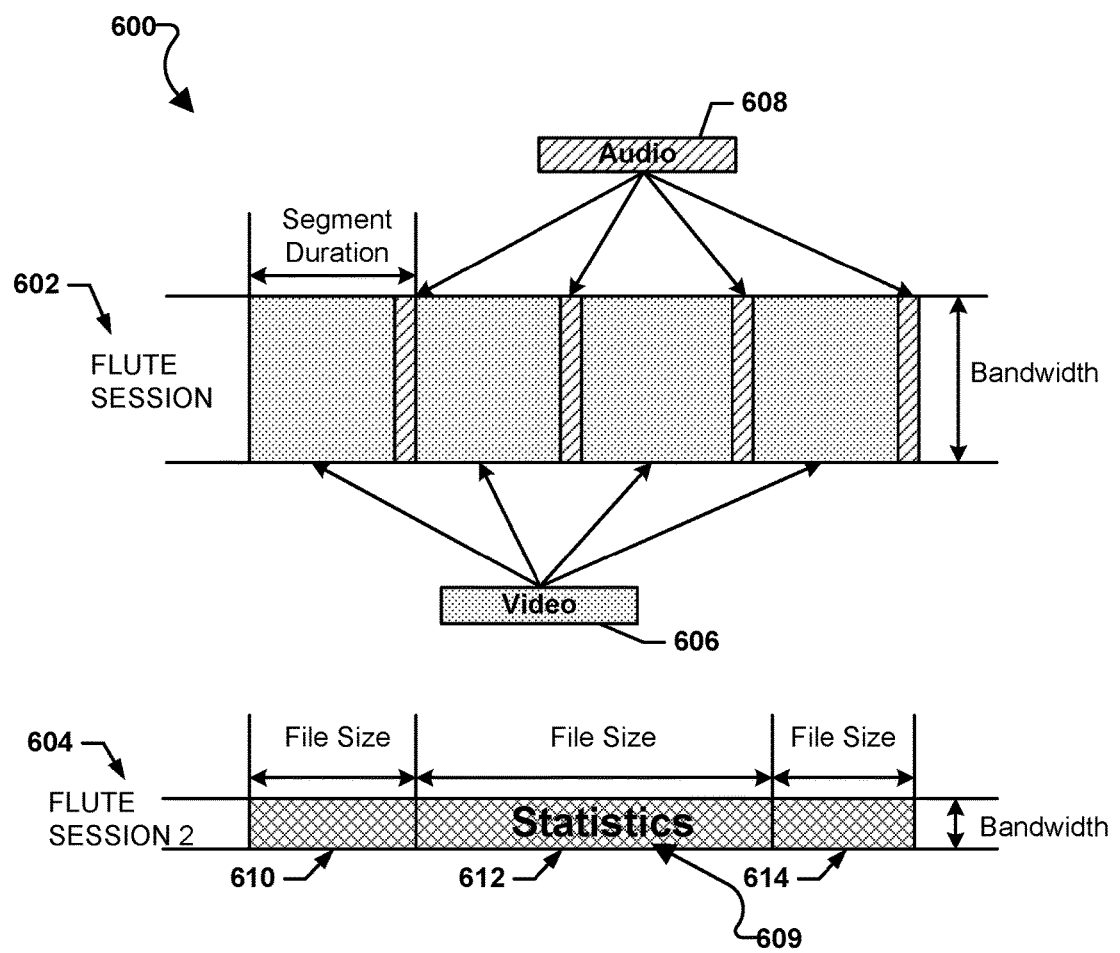
FIG. 6 is a timeline diagram illustrating data structures of a broadcast service according to a fourth embodiment.

FIG. 6 illustrates another embodiment transport scheme in which multiple FLUTE sessions 602, 604 are provided for a service 600. As an example, the service 600 may be a streaming service of an eMBMS network, such as an LTE network. The service 600 may include three data streams, 606, 608, and 609, each comprised of different types of data. As an example, a first data stream 606 may be a video data stream comprised of video files, a second data stream 608 may be an audio stream comprised of audio files, and a third data stream 609 may be a file stream comprised of files 610, 612, and 614. As an example, the files 610, 612, 614 may be sports statistics files of different file sizes. The first data stream 606 and second data stream 608 may both be broadcast in the same FLUTE session 602.

The third data stream 609 may be broadcast in its own FLUTE session 604. In this manner, a receiver device may join the FLUTE session 602 to receive the first data stream 606 and second data stream 608 and/or join the FLUTE session 604 to receive the third data stream 609. In an embodiment, a diary file, such as a service discovery file, provided to the receiver device may indicate the service 600, the FLUTE sessions 602 and 604, a type of data in each data stream 606, 608, and 609, and the FLUTE session 602 or 604 scheduled for each data stream 606, 608, and 609.

Figure 7:
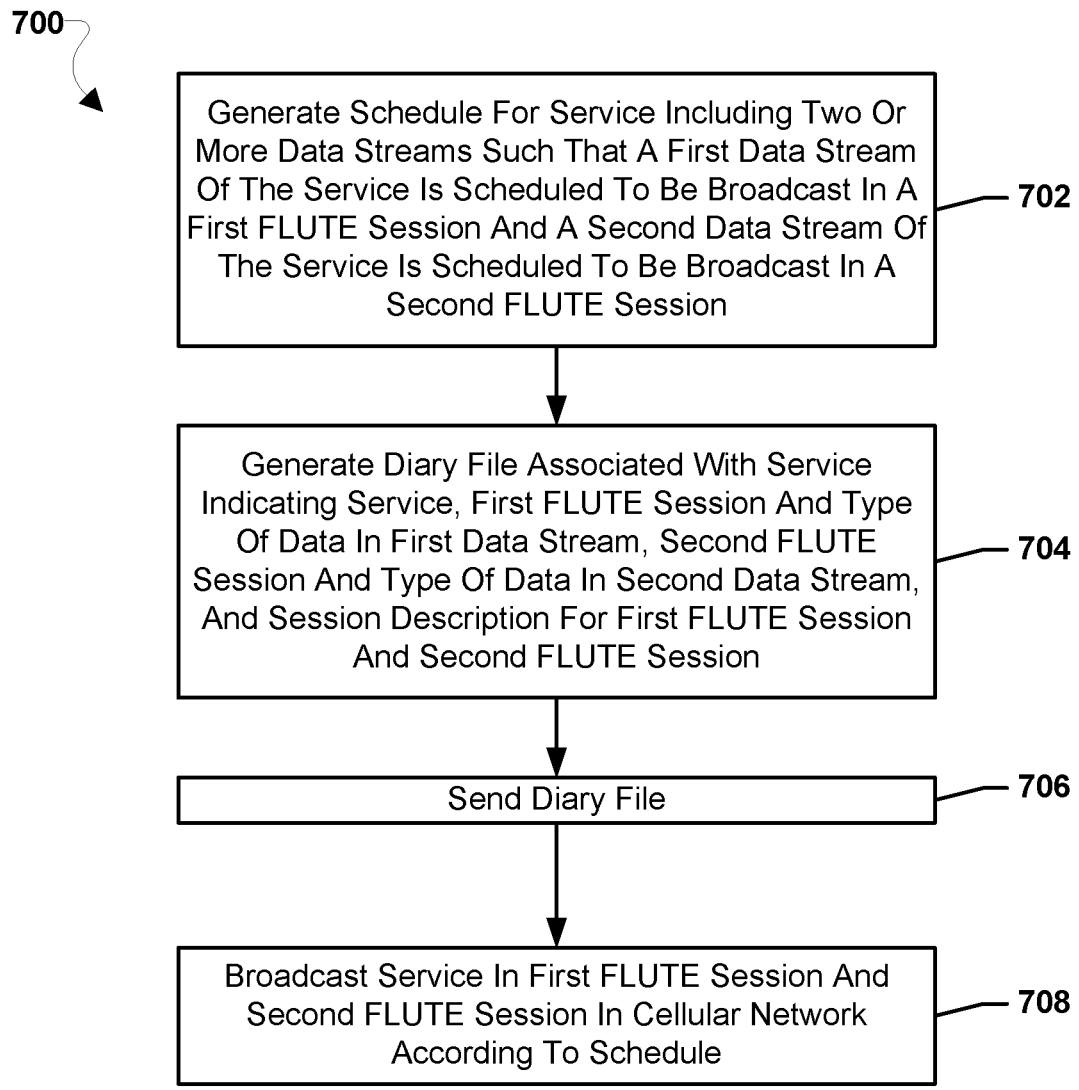
FIG. 7 is a process flow diagram illustrating an embodiment method for generating a diary file for a service broadcast via multiple FLUTE sessions.

FIG. 7 illustrates an embodiment method 700 for generating a diary file for a service broadcast via multiple FLUTE sessions. In an embodiment, the operations of method 700 may be performed by a server of a network operator, such as an eMBMS network server.

In block 702 the server may generate a schedule for a service including two or more data streams such that a first data stream of the service is scheduled to be broadcast in a first FLUTE session and a second data stream of the service is scheduled to be broadcast in a second FLUTE session. In an embodiment, the generated schedule may be a broadcast schedule used to control when content will be broadcast over a cellular network, such as an eMBMS network, for receipt by receiver devices. As an example, a video data stream for a service may be scheduled for a first FLUTE session and an audio data stream for a service may be scheduled for a second FLUTE session.

In block 704 the server may generate a diary file associated with the service indicating the service, the first FLUTE session and the type of data in the first data stream, the second FLUTE session and the type of data in the second data stream, and the session description (e.g., a SDP) for the first FLUTE session and the second FLUTE session. In an embodiment, the diary file may indicate the first FLUTE session by the identifier (e.g., source Internet Protocol ("IP") address and transport session identifier ("TSI")) for the first FLUTE session and may indicate the second FLUTE session by the identifier (e.g., source IP address and transport session identifier) for the second FLUTE session. The diary file may be any type file, such as a session announcement, schedule fragment, user service description (e.g., a USD), etc. In an embodiment, the data type of the data stream and the FLUTE session carrying the data stream may be indicated in the session description (e.g., a SDP). In an embodiment, the session description (e.g., a SDP) may be included in a service announcement for the service.

In block 706 the server may send the diary file. As an example, the server may send the diary file via a broadcast channel dedicated to scheduling information. As another example, the diary file may be sent via a unicast channel directly to a receiver device.

In block 708 the server may broadcast the service in the first FLUTE session and the second FLUTE session in a cellular network according to the schedule. As an example, when the first data stream of the service is scheduled for broadcast in the first FLUTE session and the second data stream of the service is scheduled for broadcast in the second FLUTE session, the server may broadcast the first data stream in the first FLUTE session and broadcast the second data stream in the second FLUTE session. In this manner, a receiver device joining the first FLUTE session may receive the first data stream of the service and by joining the second FLUTE session may receive the second data stream of the service.

Figure 8:
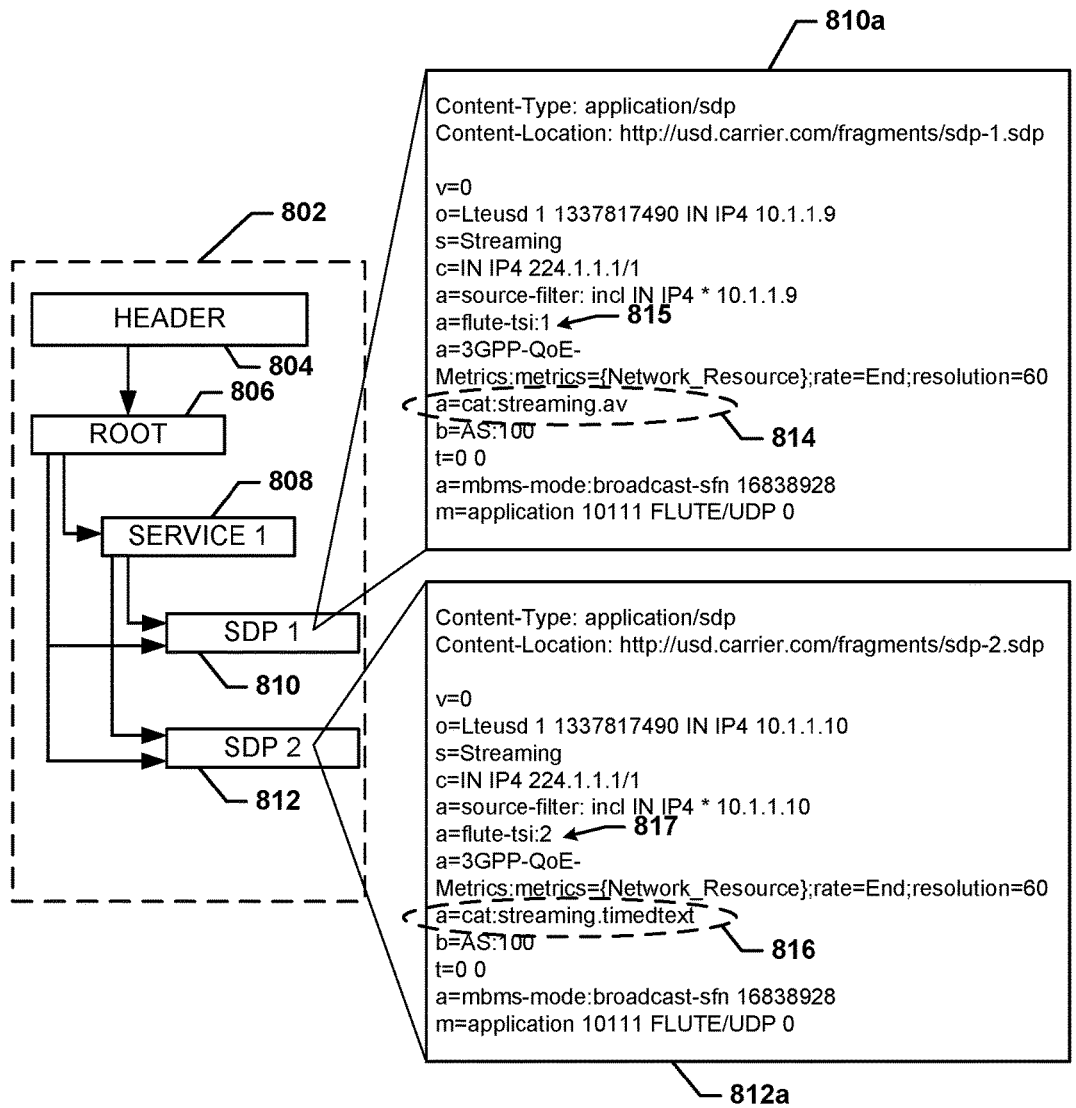
FIG. 8 is a data structure diagram of a service announcement according to an embodiment.

FIG. 8 illustrates a service announcement 802 according to an embodiment. The service announcement 802 may include a header 804 and a root path 806. The service announcement may indicate one or more services 808 which may be available. The service 808 may include multiple data streams broadcast in multiple FLUTE sessions, such as two or more data streams broadcast in two or more FLUTE sessions, and each data stream for the service may be associated with its own session description, such as SDP 1 810 and SDP 2 812. In an embodiment, the service announcement 802 may indicate the associated session descriptions by addresses (e.g., Uniform Resource Identifiers "URIs") corresponding to the location where the session descriptions, such as SDP 1 810 and SDP 2 812, may be available.

FIG. 8 further illustrates an example schema 810a associated with SDP 1 810 and an example schema 812a associated with SDP 2 812. Schema 810a associated with SDP 1 810 differs from schema 812a associated with SDP 2 812 in multiple ways, one of which is that the transport session identifier ("TSI") 815 in schema 810a is different from the TSI 817 in schema 812a.

In an embodiment, the type of data in the data stream(s) associated with a session description may be indicated by a category attribute in the service description. As an example, schema 810a may include a category attribute including a category tag 814 and schema 812a may include a category attribute including a category tag 816.

In an embodiment, the category tags 814 and 816 may indicate the type of data in the data stream(s) associated with the session description and carried by the scheduled FLUTE session for that data stream(s). As an example, the category tag 814 may be "streaming.av" indicating the FLUTE session associated with the SDP 1 810 may carry audio and video data streams for the service. As another example, the category tag 816 may be "streaming.timedtext" indicating the FLUTE session associated with the SDP 2 812 may carry timed text files.

Figure 9:
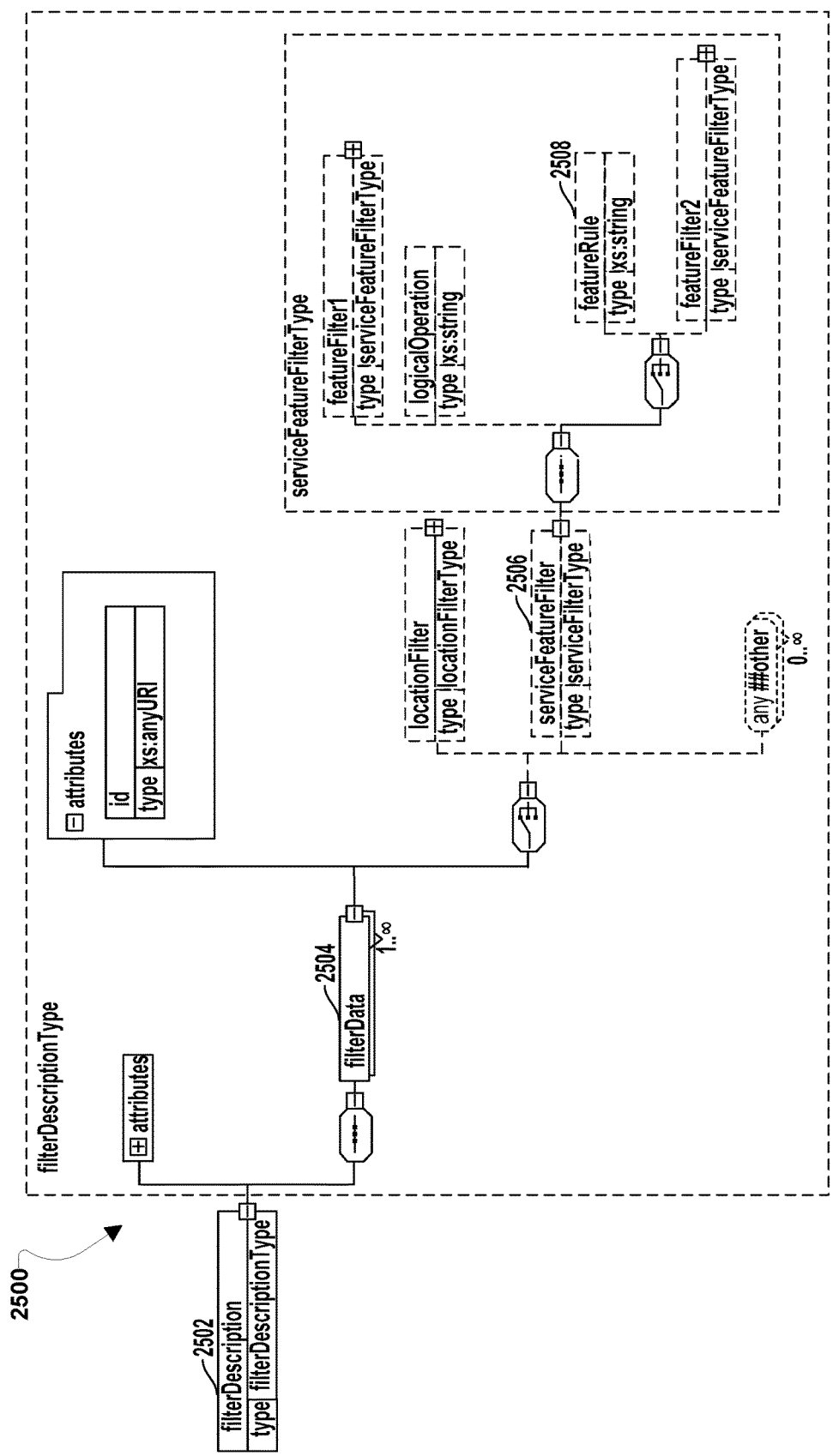
FIG. 9 is a data structure diagram of a filter description according to an embodiment.

FIG. 9 is a data structure diagram of a filter description 2500 according to an embodiment. A filter description 2500 may include a filter description element 2502, one or more associated filter data elements 2504, a service feature filter element 2506, and a feature rule element 2508. In an embodiment, the type of data broadcast in the multiple FLUTE sessions associated with a service may be indicated in a service filter, such as a service feature filter element 2506. As an example, a filter tag and an associated filter rule element 2508 including a category tag may be present in the service feature filter element 2506, and a filter tag in a delivery method may refer back to the filter rule element 2508 and identifying category tag for the service. As a specific example, the service feature filter element 2506 may be a filter fragment referenced by a first session description and second session description and a first category attribute and a second category attribute may be coded in filtering rules in the filter fragment.

Figure 10:
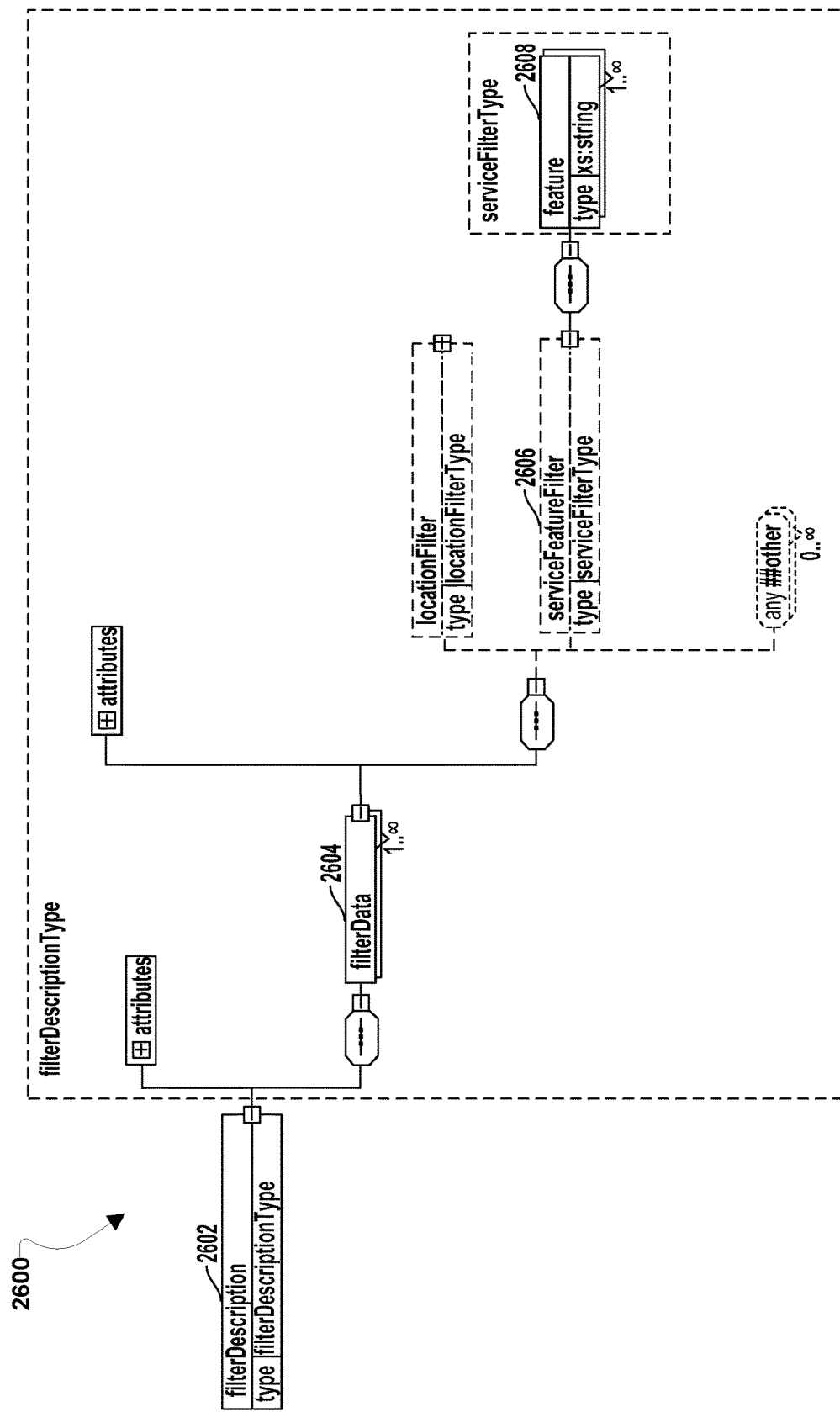
FIG. 10 is a data structure diagram of another filter description according to an embodiment.

FIG. 10 is a data structure diagram of another filter description 2600 according to an embodiment. A filter description 2600 may include a filter description element 2602, one or more associated filter data elements 2604, a service feature filter element 2606, and a feature element 2608. In an embodiment, the type of data broadcast in the multiple FLUTE sessions may be indicated by including a category tag of a service directly in the filter description metadata in the feature element 2608.

Figure 11:
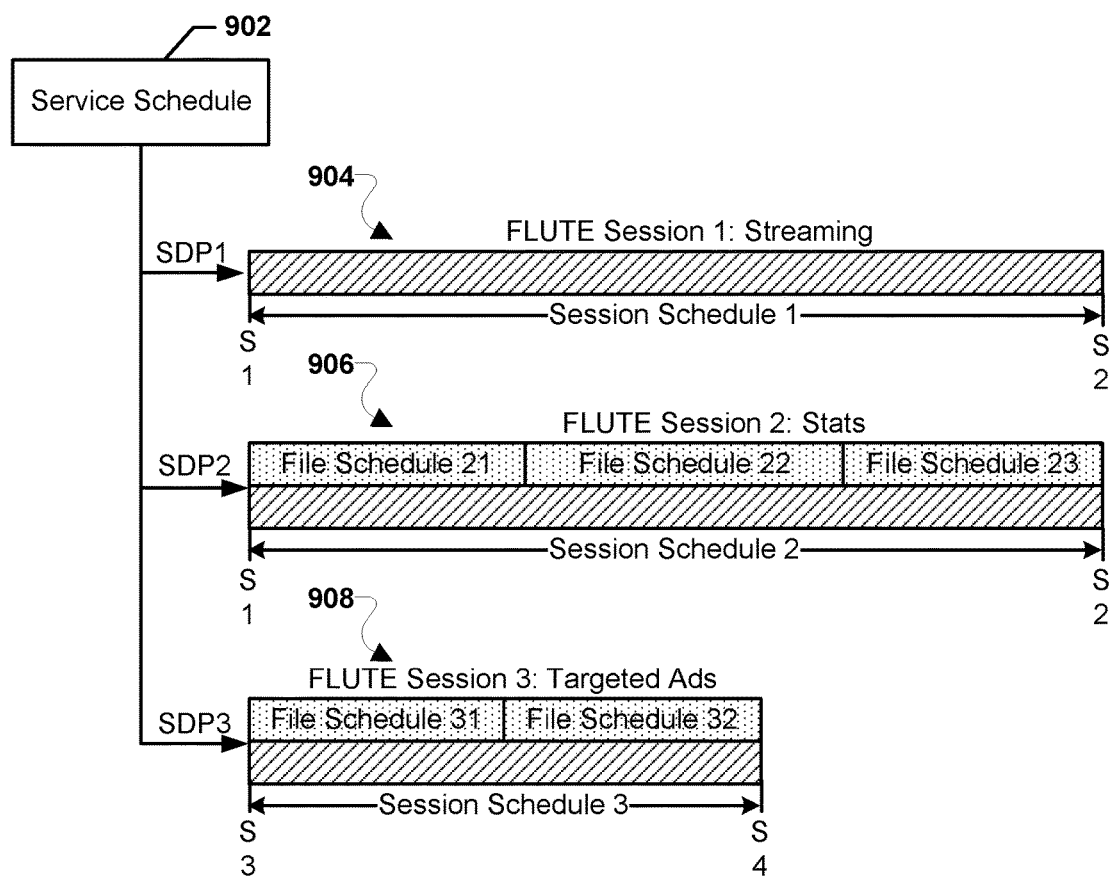
FIG. 11 is a timeline diagram illustrating audio and video content allocations across FLUTE sessions according to an embodiment.

FIG. 11 illustrates a service schedule 902 according to an embodiment. In an embodiment, the service schedule 902 may indicate the service includes three data streams, a video stream 904, a statistics stream 906, and a targeted advertisement stream 908. The service schedule 902 may indicate FLUTE session 1 may carry the video stream 904, FLUTE session 2 may carry the statistics stream 906, and FLUTE session 3 may carry the targeted advertisement stream 908. In an embodiment, the service schedule 902 may indicate the information for each stream in a session descriptions SDP 1, SDP 2, and SDP 3 associated with each FLUTE session 1, 2, and 3, respectively. As an example, the URI of each respective session description SDP 1, SDP 2, and SDP 3 may be indicated in the service schedule 902 to identify each of the respective FLUTE sessions 1, 2, and 3 that may be associated with each schedule description of the service. In an embodiment, the service schedule 902 may be a schedule fragment provided to receiver devices to enable receiver devices to join the various FLUTE sessions 1, 2, and/or 3 and receive and render the service.

Figure 12:
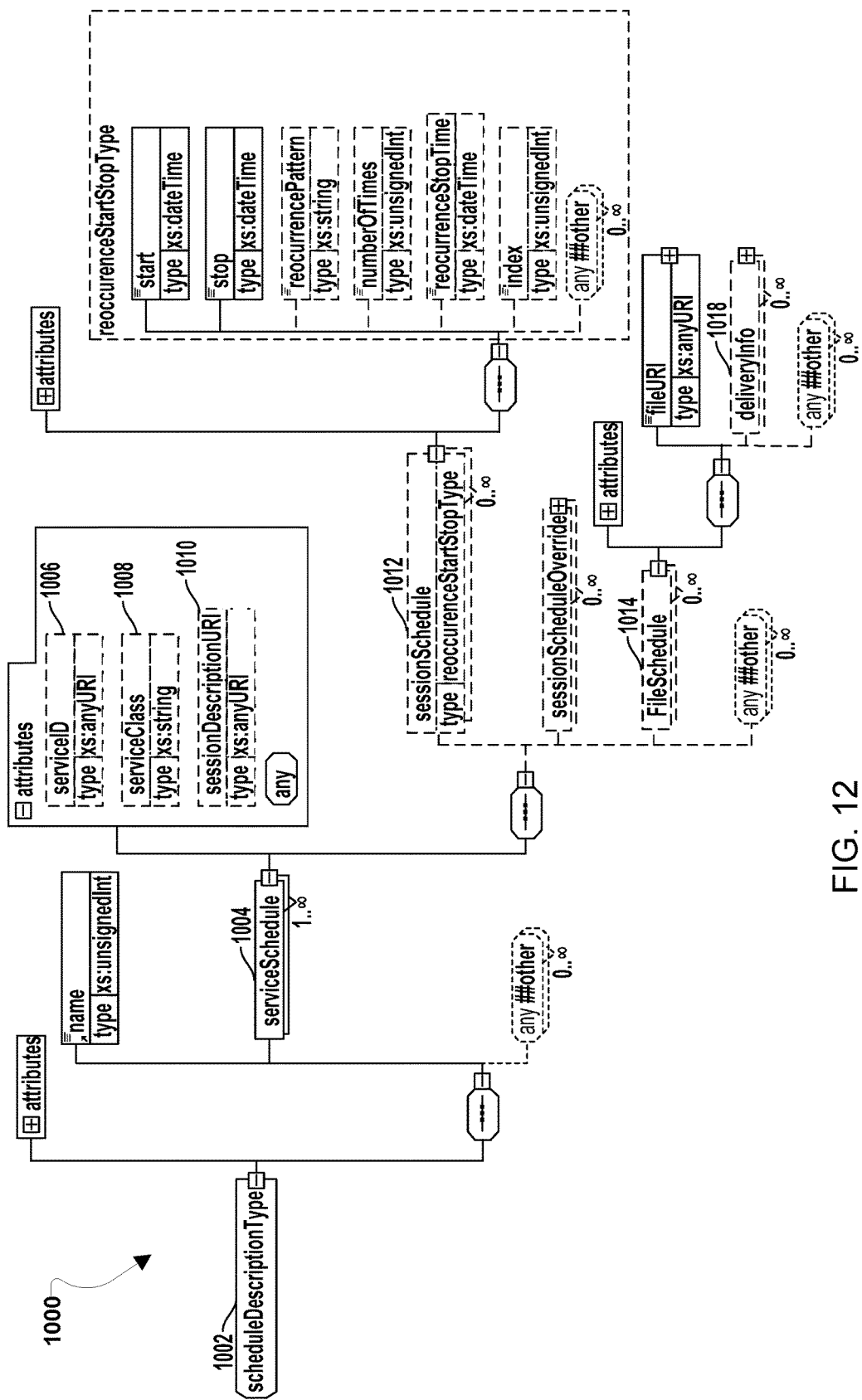
FIG. 12 is a data structure diagram of a schedule fragment according to an embodiment.

FIG. 12 is a data structure diagram of a schedule fragment 1000 according to an embodiment. In an embodiment, the schedule description 1002 of the schedule fragment 1000 may include one or more service schedules 1004. Attributes of each service schedule 1004 may provide the service ID 1006 of the service, service class 1008 of the service, and session description URI 1010. The service schedule 1004 may also relate the session schedule 1012 and file schedule 1014 to the attributes of the service schedule 1004. In this manner, for a service that includes multiple FLUTE sessions, including a session description URI 1010 pointing to the session description (e.g., a SDP) describing one of the FLUTE sessions for the service identifies the sessions and/or file schedules for that FLUTE session via the same schedule fragment 1000.

Figure 13:
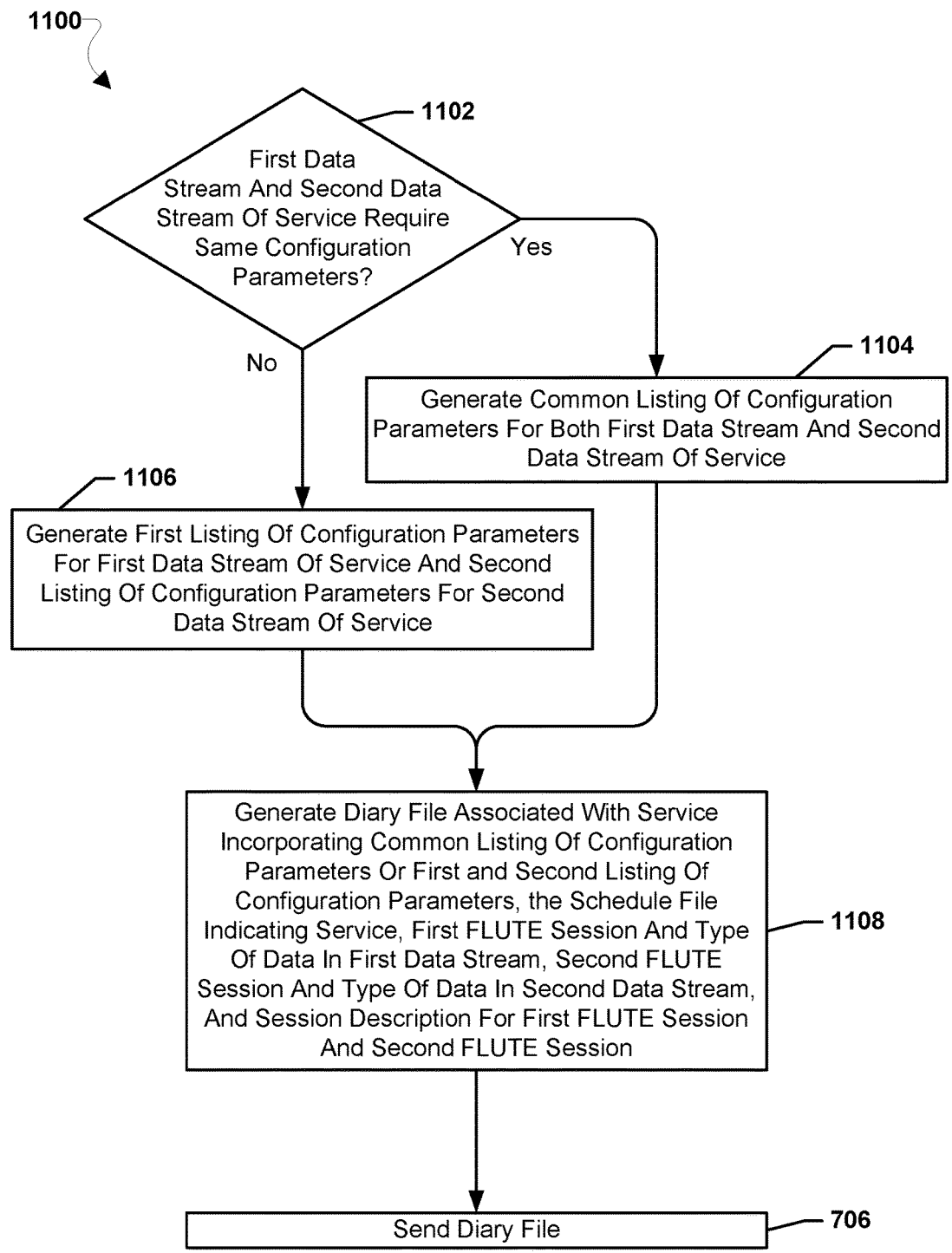
FIG. 13 is a process flow diagram illustrating an embodiment method for generating one or more listings of configuration parameters for a service broadcast via multiple FLUTE sessions.

FIG. 13 illustrates an embodiment method 1100 for generating one or more listings of configuration parameters, such as an associated delivery procedure description (e.g., ADPD), for a service broadcast via multiple FLUTE sessions. In an embodiment, the operations of method 1100 may be performed by a server of a network operator, such as an eMBMS network server.

In determination block 1102 the server may determine whether the first data stream and second data stream of a service require the same configuration parameters. As an example, the server may determine whether the first data stream and second data stream will use the same FEC encoding and/or same reporting requirements.

In response to determining that the configuration parameters are the same (i.e., determination block 1102="Yes"), in block 1104 the server may generate a common listing of configuration parameters for both the first data stream and the second data stream of the service. As an example, the server may generate one version of a common associated delivery procedure description (e.g., ADPD) to be used for both data streams.

In response to determining that the configuration parameters are different (i.e., determination block 1102="No"), in block 1106 the server may generate a first listing of configuration parameters for the first data stream of the service and a second listing of configuration parameters for the second data stream of the service. As an example, the server may generate a first associated delivery procedure description (e.g., ADPD) for the first stream and a second associated delivery procedure description (e.g., ADPD) for the second stream.

In block 1108 the server may generate a diary file associated with the service incorporating the common listing of configuration parameters (e.g., a common associated delivery procedure description) or the first and second listing of configuration parameters (e.g., first associated delivery procedure description and a second associated delivery procedure description), the diary file indicating the service, the first FLUTE session and the type of data in the first data stream, the second FLUTE session and the type of data in the second data stream, and a session description for the first FLUTE session and the second FLUTE session. The diary file may be any type file, such as a session announcement, schedule fragment, user service description (e.g., a USD), etc. As discussed above, in block 706 the server may send the diary file.

Figure 14:
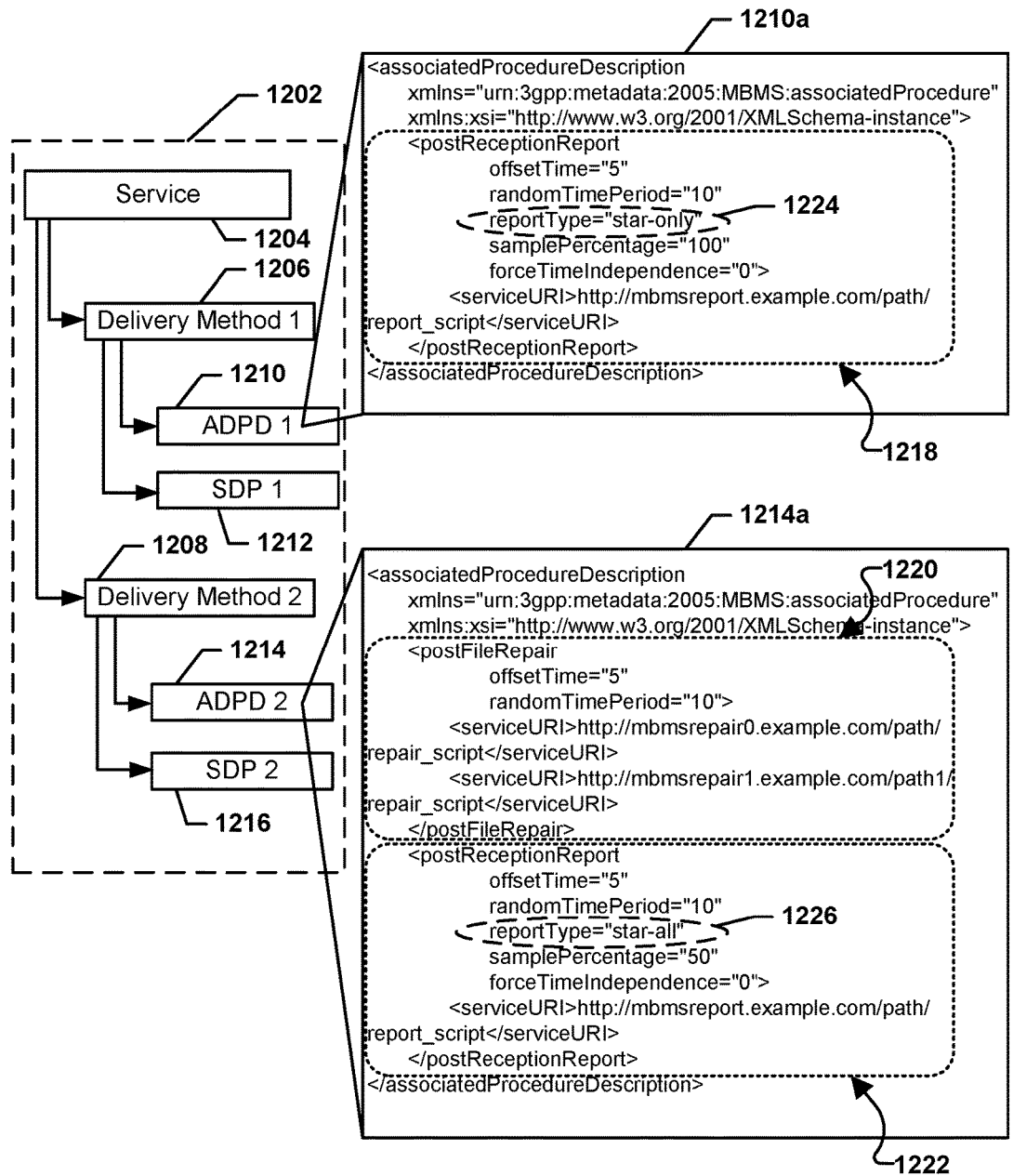
FIG. 14 is a data structure diagram of a service announcement including a listing of configuration parameters according to an embodiment.

FIG. 14 illustrates a service announcement 1202 according to an embodiment. The service announcement 1202 may indicate the service 1204 and the delivery methods 1206 and 1208 for the service. Each delivery method 1206 and 1208 may include its own unique session description SDP 1 1212 and SDP 2 1216, respectively. Each delivery method 1206 and 1208 may include its own unique associated delivery procedure description, ADPD 1 1210 and ADPD 2 1214, respectively. As illustrated by the example schema 1210a of associated delivery procedure description ADPD 1 1210 and example schema 1214a of associated delivery procedure description ADPD 2 1214, the associated delivery procedure descriptions ADPD 1 1210 and ADPD 2 1214 may include different elements, such as different report elements 1218 and 1222 indicating different reporting requirements 1224 and 1226. Additionally schema 1214a may include file repair element 1220 not present in schema 1210a. In this manner, configuration parameters which may be different for each FLUTE session may be provided on a per delivery method 1206 and 1208 basis.

Figure 15:
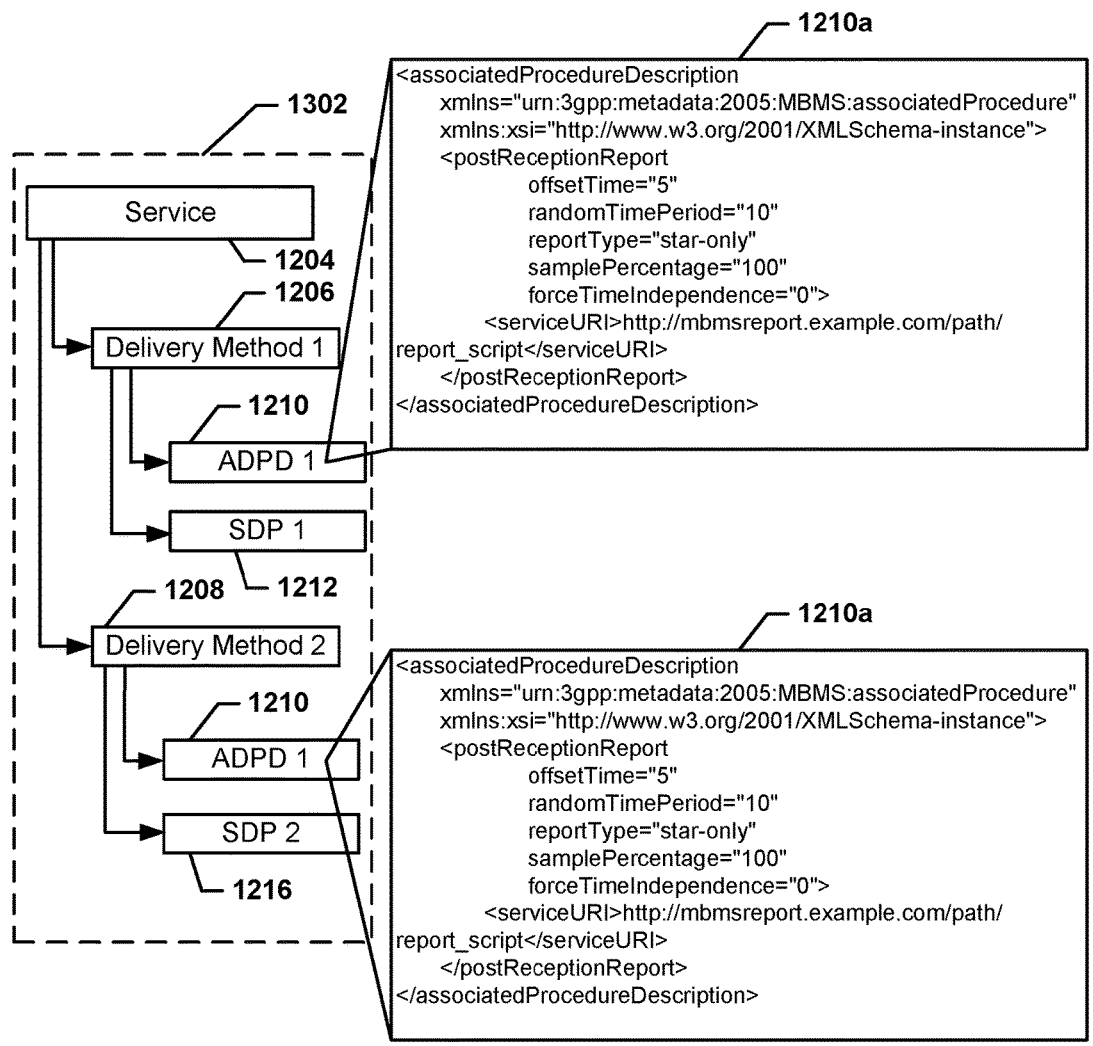
FIG. 15 is a data structure diagram of a service announcement including a listing of configuration parameters according to another embodiment.

FIG. 15 illustrates a service announcement 1302 according to an embodiment, which is similar to the service announcement 1202 illustrated in FIG. 14, except in service announcement 1302 the same associated delivery procedure description ADPD 1 1210 may be used for each delivery method 1206 and 1208. As an example, the configuration parameters for the FLUTE session associated with each delivery method may be the same, and the associated delivery procedure description ADPD 1 1210 may be repeated in each delivery method.

Figure 16:
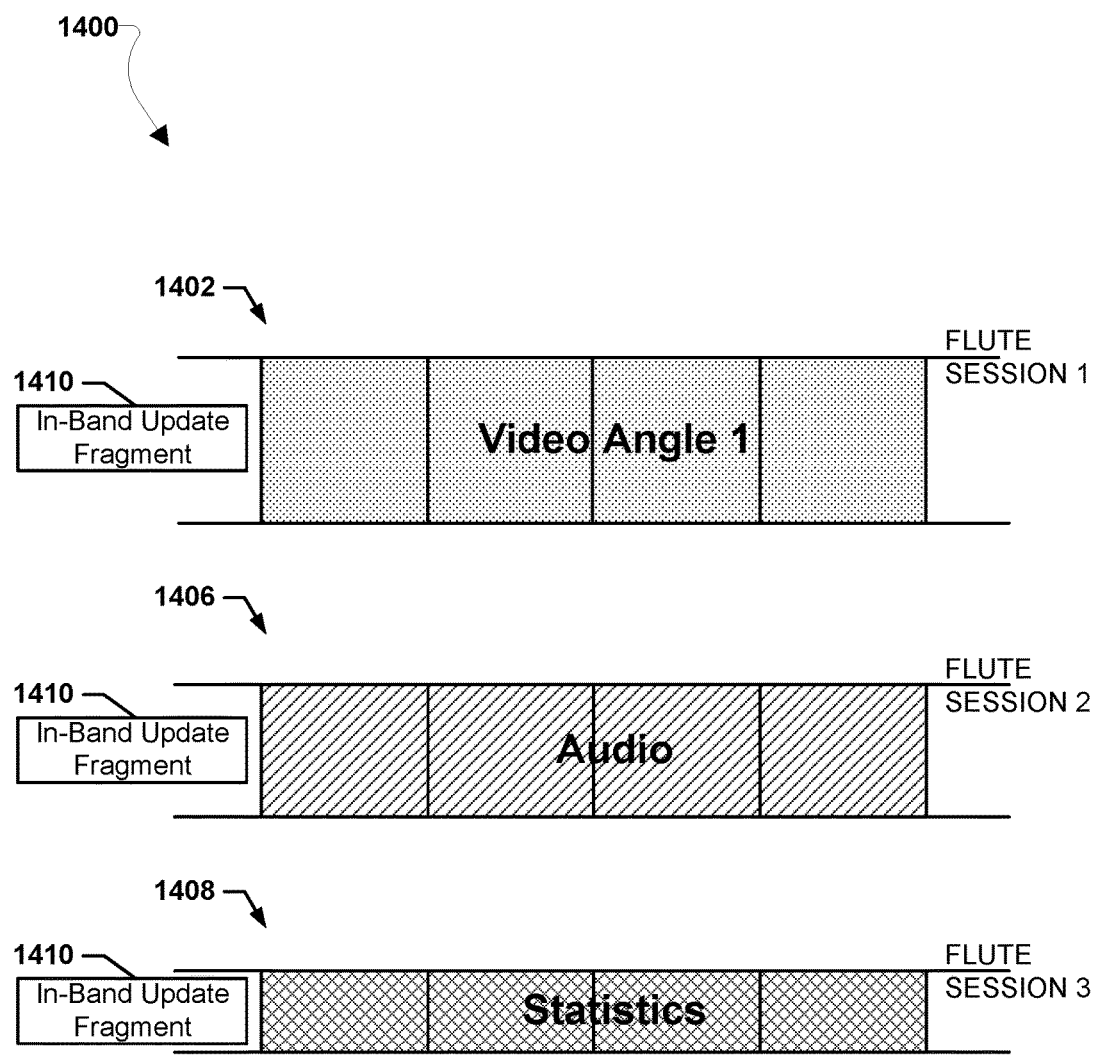
FIG. 16 is a timeline diagram illustrating data structures providing in-band updates for a broadcast service according to an embodiment.

FIG. 16 illustrates an embodiment transport scheme in which in-band updates for a broadcast service 1400 may be provided in each FLUTE session 1402, 1406, and 1408 of the service 1400. The same in-band update fragment 1410 (e.g., a media presentation description update fragment, schedule update fragment, and/or associated delivery procedure description update fragment) may be broadcast in all of the FLUTE sessions of the service 1402, 1406, and 1408 such that a receiver device joining any of the FLUTE sessions 1402, 1406, and 1408 may receive in-band updates for the service 1400.

Figure 17:
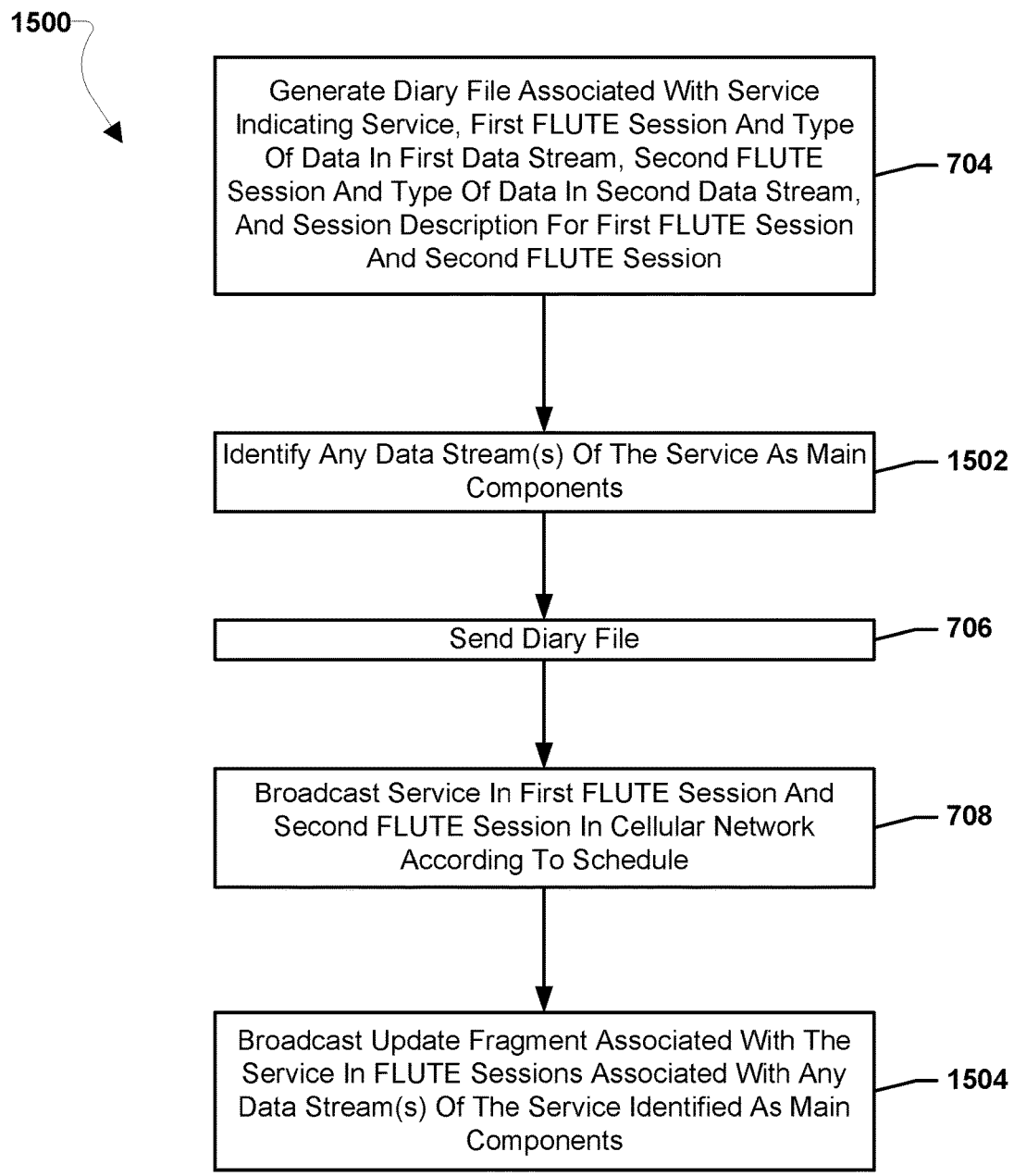
FIG. 17 is a process flow diagram illustrating an embodiment method for broadcasting in-band updates for a service broadcast via multiple FLUTE sessions.

FIG. 17 illustrates an embodiment method 1500 for broadcasting in-band updates for a service broadcast via multiple FLUTE sessions. In an embodiment, the operations of method 1500 may be performed by a server of a network operator, such as an eMBMS network server. As discussed above, in block 704 the server may generate a diary file associated with the service indicating the service, the first FLUTE session and type of data in the first data stream of the service, the second FLUTE session and type of data in the second data stream of the service, and the session description for the first FLUTE session and the second FLUTE session.

In block 1502 the server may identify any streams of the service as main components of the service. A main component of a service may be a data stream or data streams of a service that are more likely than another data stream to be consumed by a receiver device. As an example, in a service with multiple video streams, and only one audio stream, the main component may be the audio stream because the audio may be rendered by the receiver device regardless of the selected video stream, thus the FLUTE session of the audio stream may be more likely to be joined at any given time.

As discussed above, in block 706 and 708 the server may send the diary file and broadcast the service in the first FLUTE session and second FLUTE session.

In block 1504 the server may broadcast an update fragment associated with the service in the FLUTE session(s) associated with any data stream(s) of the service identified as main components. In this manner, in-band updates may be broadcast only in the FLUTE session(s) of the main component data stream(s) of the service.

Figure 18:
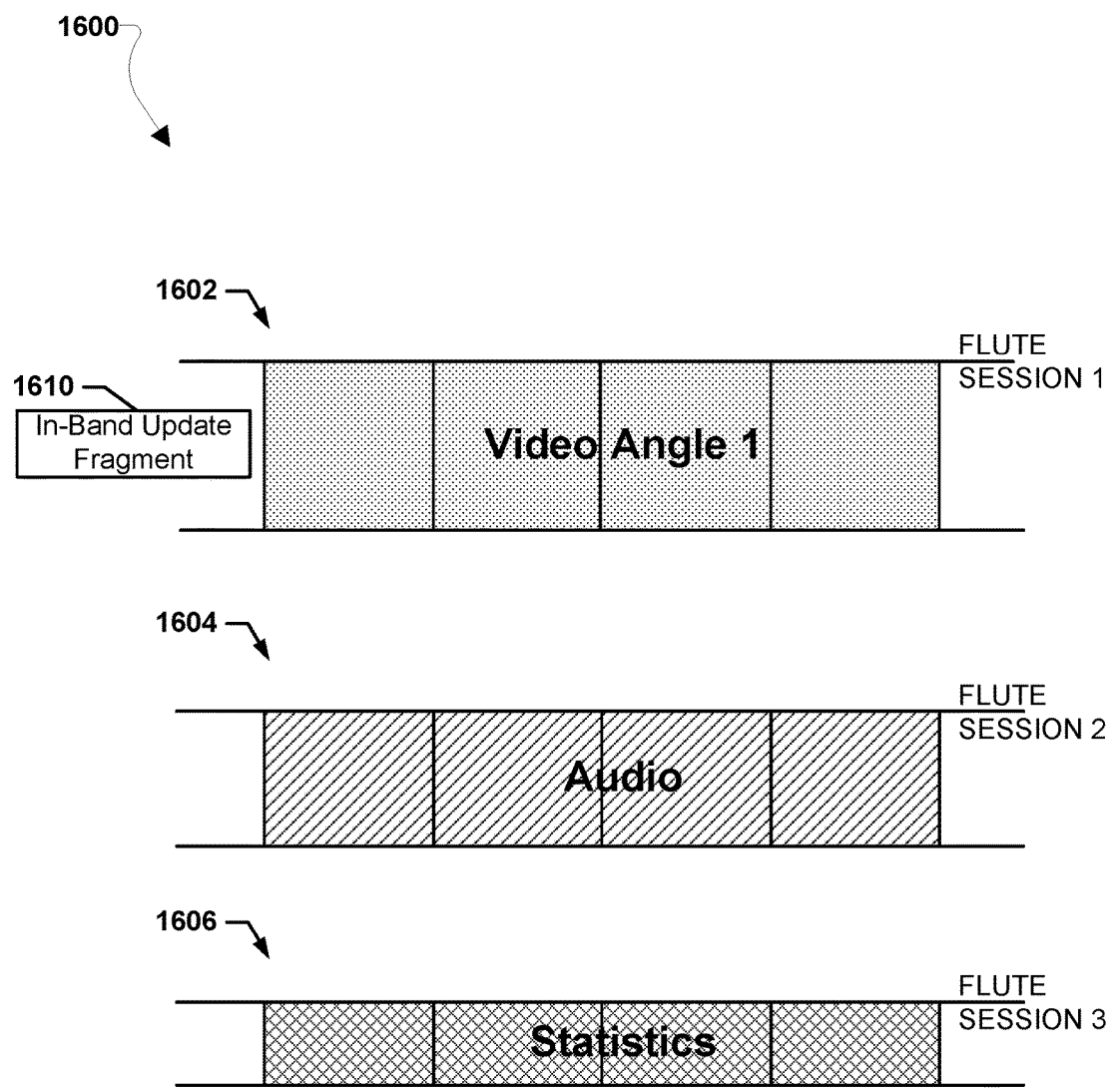
FIG. 18 is a timeline diagram illustrating audio and video content allocations across FLUTE sessions providing in-band updates for a broadcast service according to another embodiment.

FIG. 18 illustrates an embodiment transport scheme in which in-band updates for a broadcast service 1600 may be provided in the FLUTE session associated with the main component of the service 1600. As an example, the main component of the service 1600 may be identified as the data stream of VideoAngle1 of the service 1600. The server may only send an in-band update fragment 1610 via the FLUTE session 1602 associated with the main component data stream.

In an embodiment, in-band updates may not be sent via FLUTE sessions 1604 and 1606 associated with FLUTE session that may not be main components.

In an embodiment, a receiver device may be configured to monitor the FLUTE session 1602 for in-band updates and apply any in-band updates to other data streams and FLUTE sessions 1604 and 1606 as applicable. The in-band updates may identify the data stream and FLUTE session to which they apply. In an embodiment, the receiver device may be configured to join a FLUTE session 1602 regardless of whether the VideoAngle1 data stream is to be consumed by the receiver device. In this manner, the receiver device may ensure in-band updates are received.

Figure 19:
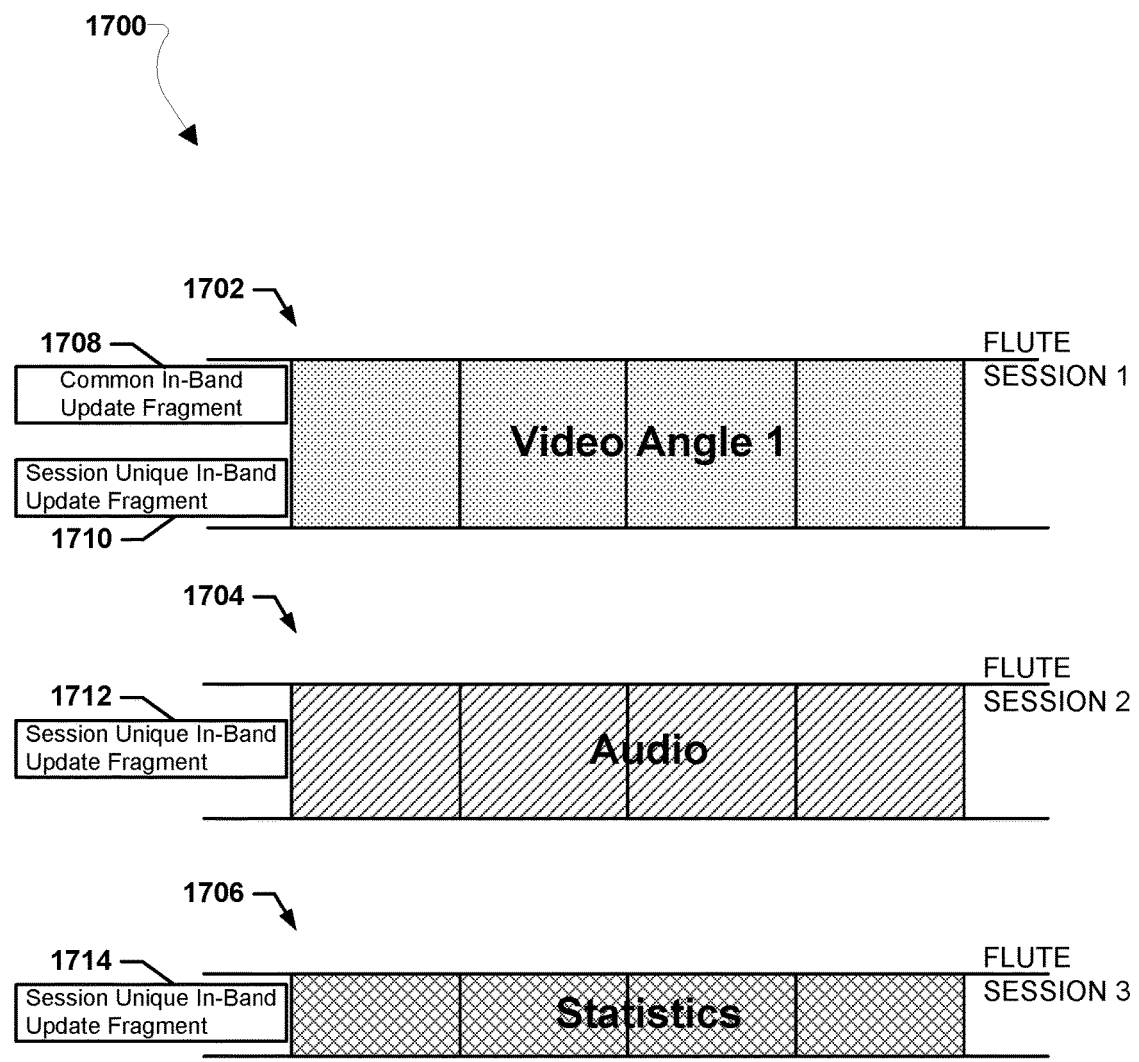
FIG. 19 is a timeline diagram illustrating audio and video content allocations across FLUTE sessions providing in-band updates for a broadcast service according to a further embodiment.

FIG. 19 illustrates an embodiment transport scheme in which in-band updates common to all data streams of a broadcast service 1700 may be provided in the FLUTE session of the main component, while data stream specific and/or FLUTE session specific in-band updates may be provided on each applicable FLUTE session, respectively. As an example, the main component of the service 1700 may be identified as the data stream of VideoAngle1 of the service 1700.

The server may send a common in-band update fragment 1708 via the FLUTE session 1702 associated with the main component data stream. As an example, common in-band update fragment 1708 may be an update to the media presentation description (e.g., MPD) or schedule for the service 1700. In an embodiment, common in-band updates may not be sent via FLUTE sessions 1704 and 1706 associated with FLUTE session that are not main components.

In an embodiment, each FLUTE session 1702, 1704, and 1706, respectively, may also carry session unique in-band update fragments 1710, 1712, and 1714, respectively. A session unique in-band update fragment may be an update applicable to only a specific FLUTE session and/or its associated data stream. As an example, session unique in-band update fragment may be an associated delivery procedure description (e.g., an ADPD). In an embodiment, a receiver may monitor the main component data stream's FLUTE session to receive common in-band update fragments and may monitor each joined FLUTE session to receive session unique in-band update fragments.

Figure 20:
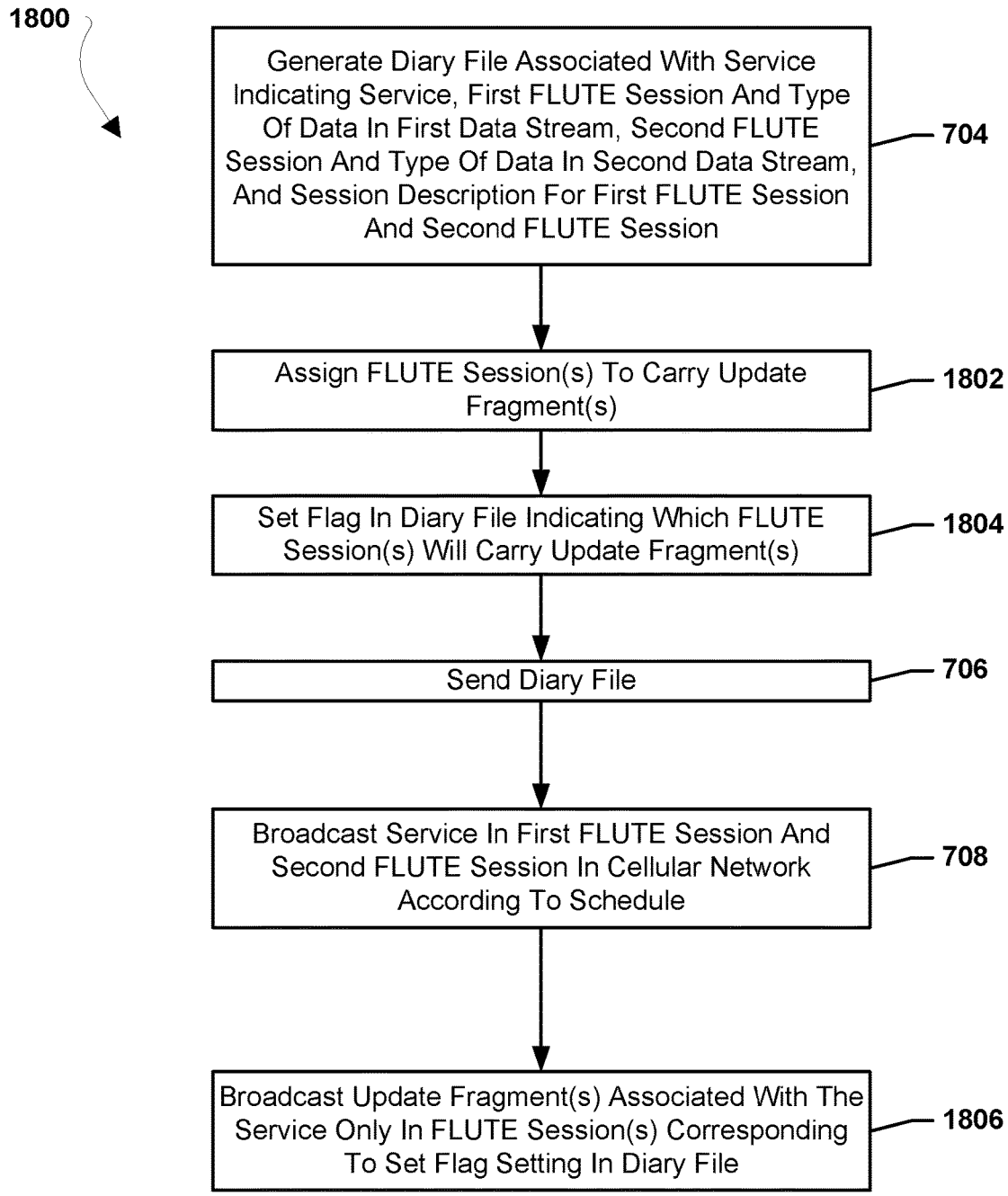
FIG. 20 is a process flow diagram illustrating an embodiment method for setting a flag is a diary file for a service broadcast via multiple FLUTE sessions.

FIG. 20 illustrates an embodiment method 1800 for setting a flag in a diary file for a service broadcast via multiple FLUTE sessions. As an example, the operations of method 1800 may be performed to set a flag in a delivery method of a user service description (e.g., a USD) for a service broadcast via multiple FLUTE sessions. In an embodiment, the operations of method 1800 may be performed by a server of a network operator, such as an eMBMS network server.

As discussed above, in block 704 the server may generate a diary file associated with the service indicating the service, the first FLUTE session and type of data in the first data stream of the service, the second FLUTE session and type of data in the second data stream of the service, and the session description for the first FLUTE session and the second FLUTE session. As an example, the server may generate a user service description (e.g., a USD) associated with the service. In block 1802 the server may assign one or more FLUTE sessions to carry update fragment(s). As an example, the server may select a FLUTE session associated with a main component data stream to carry update fragments. As another example, the server may select the FLUTE session to carry update fragments based on bandwidth.

In block 1804 the server may set one or more flags in the diary file indicating which FLUTE session(s) will carry update fragments. As an example, the server may set one or more flags in the delivery method of the user service description (e.g., a USD) indicating which FLUTE session(s) will carry update fragments. As discussed above, in block 706 and 708 the server may send the diary file and broadcast the service in the first FLUTE session and second FLUTE session.

In block 1806 the server may broadcast the update fragment(s) associated with the service only in the FLUTE session(s) corresponding to the set flag setting in the diary file (e.g., the USD). As an example, if a first FLUTE session was selected to carry the update fragments and a flag set indicating the selection in the diary file (e.g., the USD), the server may broadcast the update fragments in only the first FLUTE session for the service and not in any other FLUTE session of the service.

Figure 21:
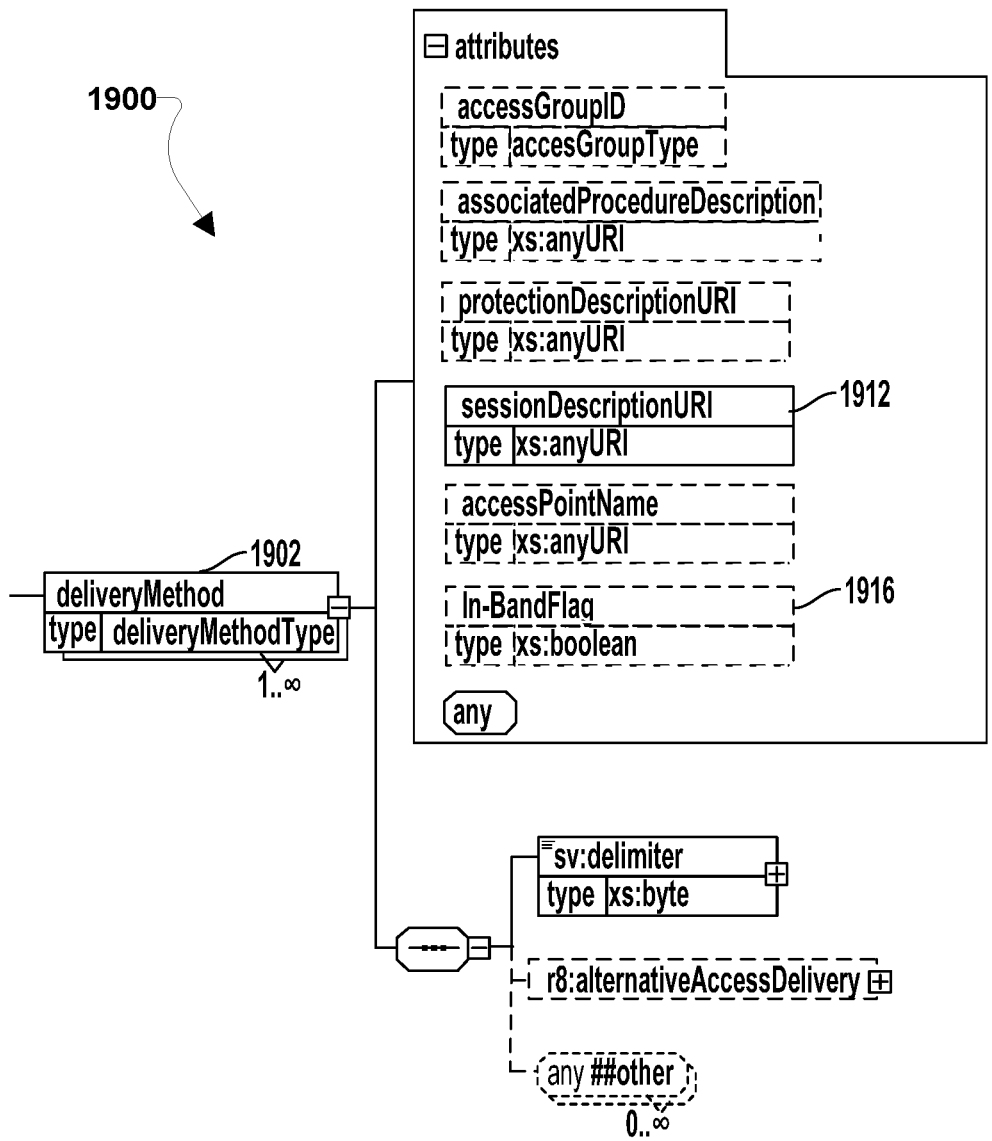
FIG. 21 is a data structure diagram of a diary file including a flag according to an embodiment.

FIG. 21 is a data structure diagram of a diary file 1900 according to an embodiment. As an example, the diary file 1900 may be a user service description (e.g., a USD). In an embodiment, one or more delivery methods 1902 of the diary file 1900 may include one or more attributes. Attributes of the delivery method 1902 may provide a session description 1912 and an in-band flag setting 1916. In this manner, a receiver device receiving the diary file 1900 (e.g., the USD) may utilize the in-band flag setting 1916 to identify the FLUTE session corresponding to the delivery method 1902 that may carry the in-band updates.

Figure 22:
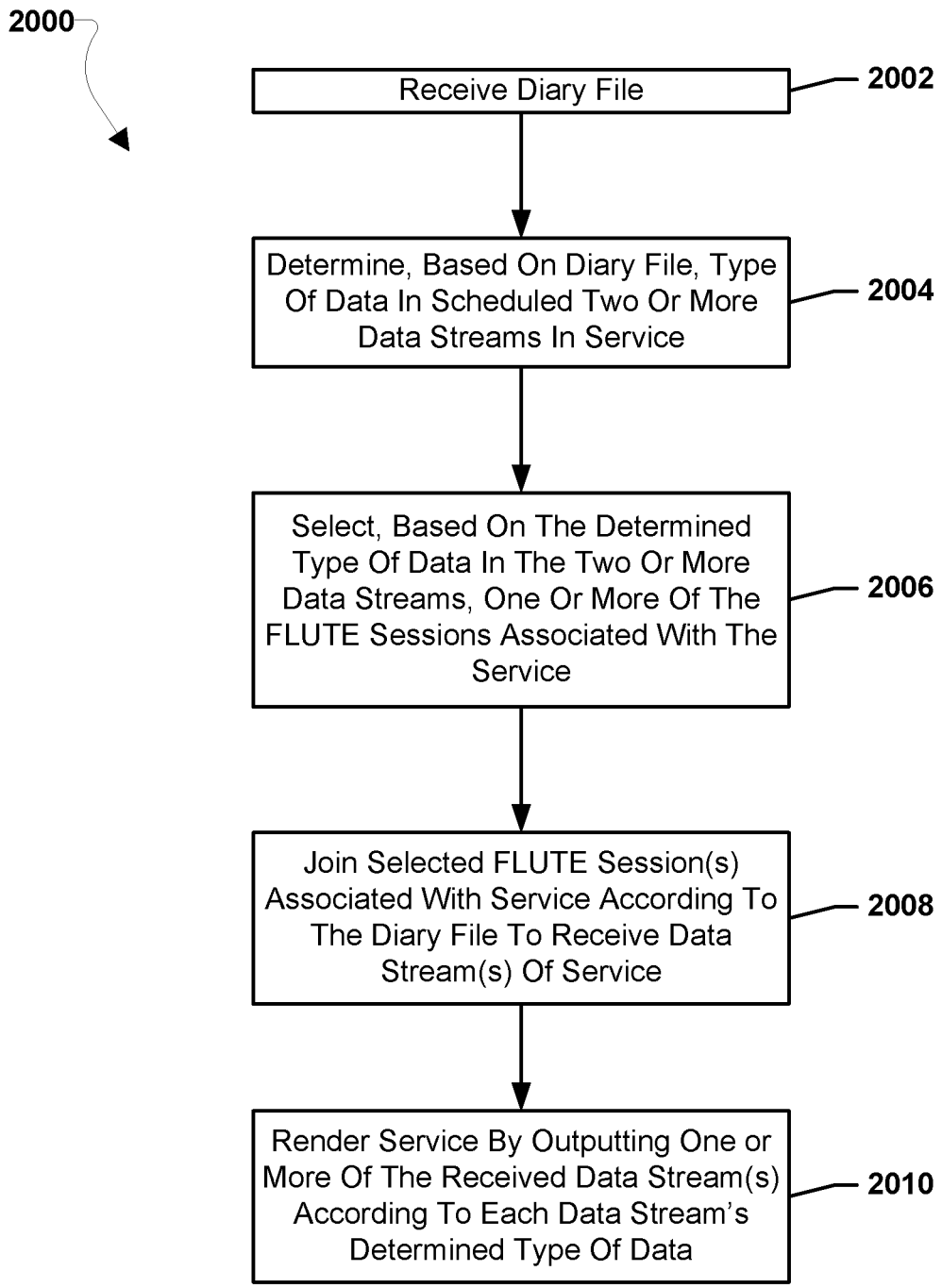
FIG. 22 is a process flow diagram illustrating an embodiment method for joining one or more FLUTE sessions to render a service broadcast via multiple FLUTE sessions.

FIG. 22 is a process flow diagram illustrating an embodiment method 2000 for joining one or more FLUTE sessions to render a service broadcast via multiple FLUTE sessions. In an embodiment, the operations of method 2000 may be performed by a client running on a processor of a receiver device, for example by a Multicast Service Device Client ("MSDC").

In block 2002 the processor may receive the diary file. In block 2004 the processor may determine, based on the diary file the type of data in the scheduled two or more data streams of a schedule service. As an example, attributes, such as category tags, may indicate the type of data in each schedule data stream.

In block 2006 the processor may select, based on the determined type of data in the two or more data streams, one or more of the FLUTE sessions associated with the service. As an example, the user may indicate he or she desires to watch a main camera view of a sporting event and listen to the audio in English, and the processor may select the FLUTE session associated with the main camera view and the FLUTE session associated with the English audio to receive the applicable data streams. In block 2008 the receiver device may join the selected FLUTE session(s) associated with the service according to the diary file to receive data stream(s) of the service. In an embodiment, the receiver device may join one or more FLUTE sessions. In an embodiment, the receiver device may join one or more FLUTE sessions and may keep any unselected FLUTE sessions inactive. In block 2010 the receiver device may render the service by outputting one or more of the received data stream(s) according to each data stream's determined type of data. As an example, the receiver device may render the main camera view by outputting video to a display and render the English audio by outputting the audio to a speaker.

Figure 23:
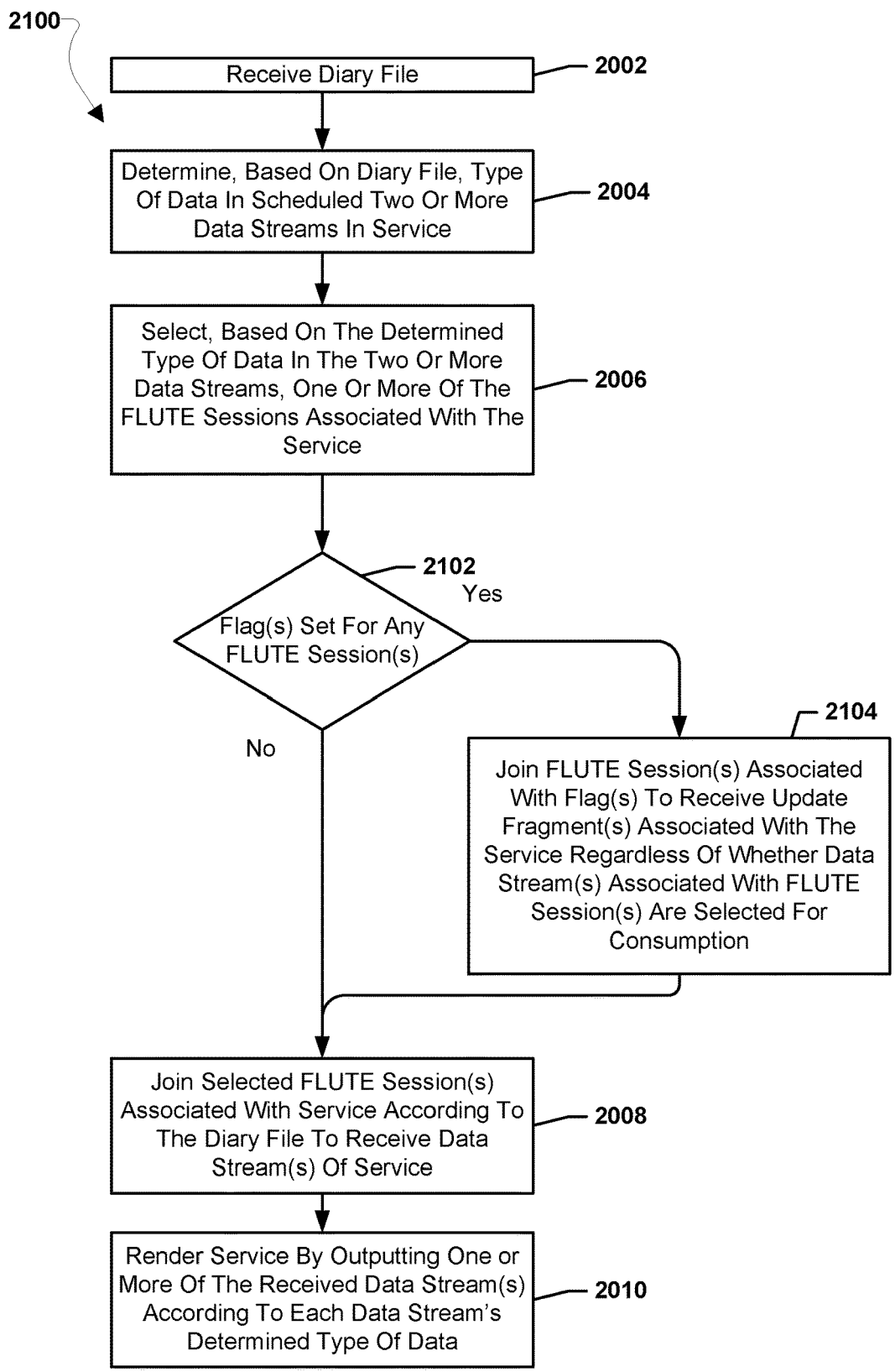
FIG. 23 is a process flow diagram illustrating an embodiment method for joining a FLUTE session to receive in-band updates.

FIG. 23 is a process flow diagram illustrating an embodiment method 2100 for joining a FLUTE session to receive in-band updates. In an embodiment, the operations of method 2100 may be performed by a client running on a processor of a receiver device, for example by a Multicast Service Device Client ("MSDC").

In blocks 2002, 2004, and 2006 the processor may perform operations of like numbered blocks of method 2000 described above with reference to FIG. 22.

In determination block 2102 the processor may determine whether any flag or flags are set for a FLUTE session. As an example, the processor may determine whether a flag (e.g., a flag associated with in-band update fragments) is set in a delivery method instance in the file schedule associated with each FLUTE session of the service.

In response to determining that a flag or flags (e.g., a flag or flags associated with in-band update fragments) are not set (i.e., determination block 2102="no"), as discussed above, in blocks 2008 and 2010 the processor may join the selected FLUTE session(s) associated with the service according to the diary file and render the service.

In response to determining that a flag or flags are set (i.e., determination block 2102="Yes"), in block 2104 the processor may join the FLUTE session(s) associated with the flag(s) to receive update fragment(s) associated with the service regardless of whether data stream(s) associated with the FLUTE session(s) are selected for consumption. In this manner, the processor may join FLUTE session(s) merely to receive in-band updates. As discussed above, in blocks 2008 and 2010 the processor may join the selected FLUTE session(s) associated with the service according to the diary file and render the service.

Figure 24:
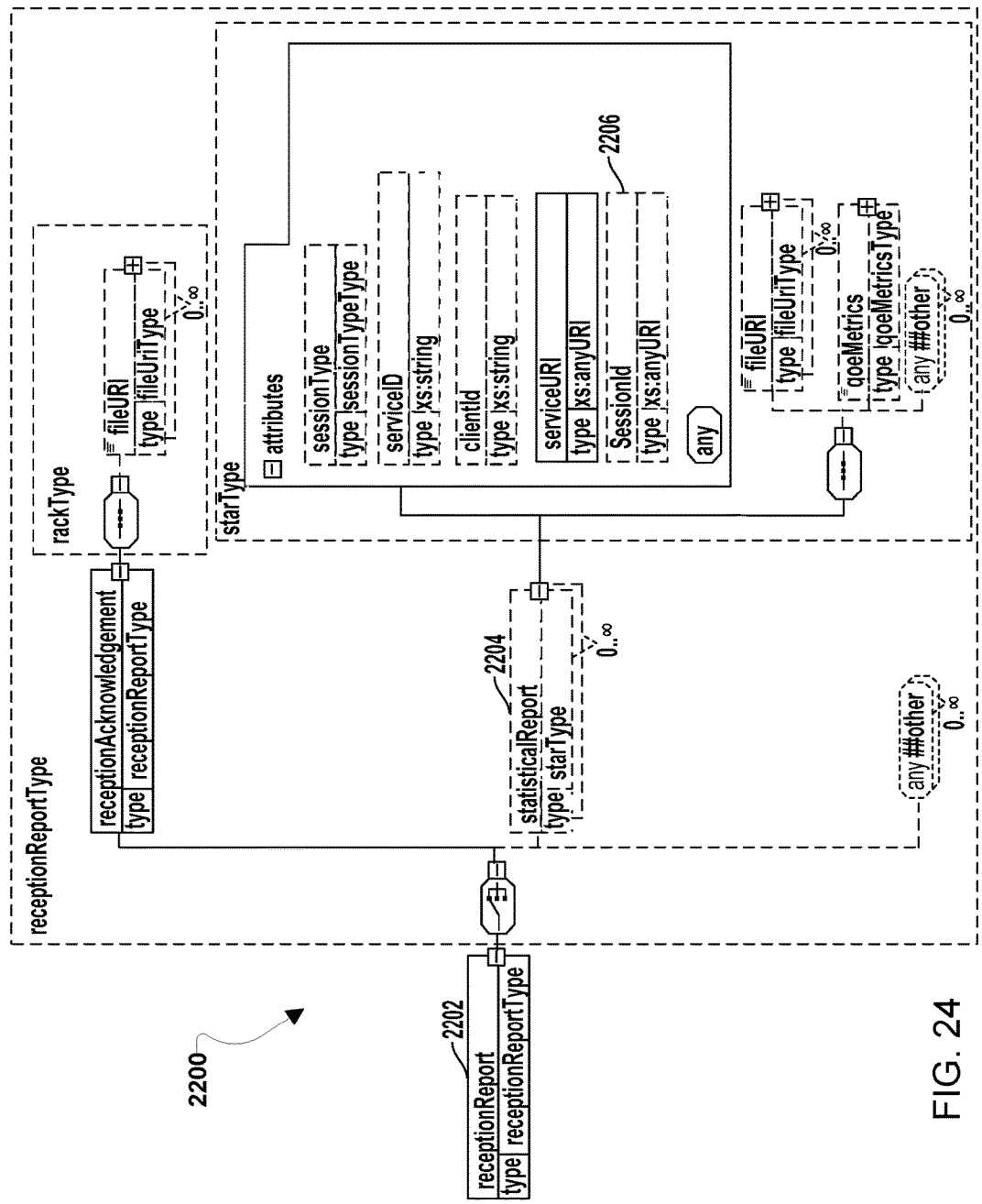
FIG. 24 is a data structure diagram of an aggregated reception report according to an embodiment.

FIG. 24 is a data structure diagram of an aggregated reception report 2200 according to an embodiment. In an embodiment, the aggregated reception report 2200 may be generated for a service including multiple FLUTE sessions and may include a FLUTE session ID for each FLUTE session associated with the service. In an embodiment, the reception report element 2202 of the aggregated reception report 2200 may include one or more statistical reports 2204, and an attribute of the statistical reports 2204 may be a session ID 2206 for each FLUTE session associated with the service. In this manner, reception reports may be aggregated on a per service basis, and sent as an aggregated reception report 2200 for all FLUTE sessions. The aggregated reception report 2200 may differentiate statistics on a per FLUTE session basis using the session ID 2206 attribute. In an embodiment, the back off period associated with the aggregated reception report 2200 may be set from the end of the largest FLUTE session associated with the service and/or the latest FLUTE session associated with the service.

Figure 25:
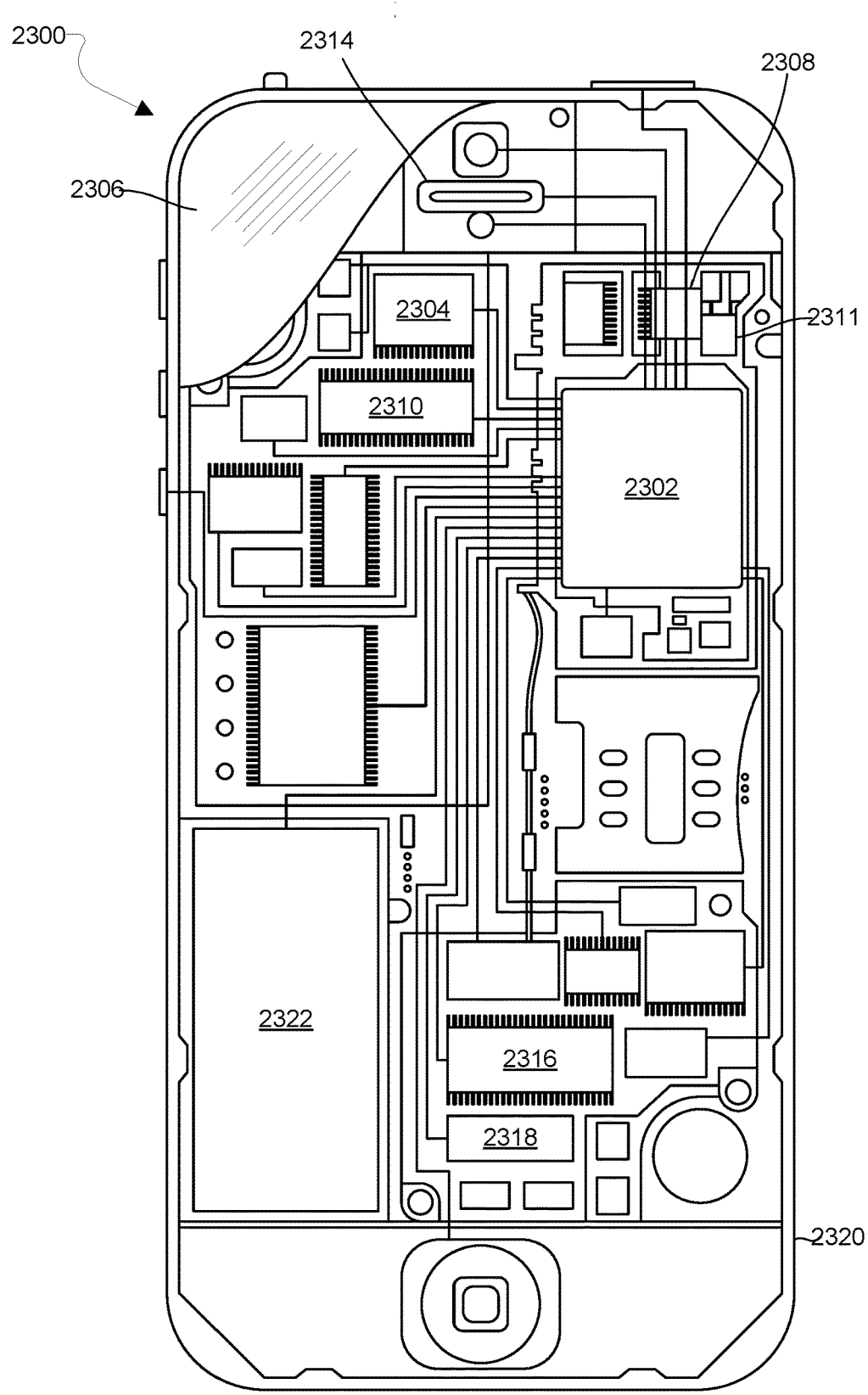
FIG. 25 is a component diagram of an example receiver device suitable for use with the various embodiments.

The various embodiments may be implemented in any of a variety of mobile devices, an example of which is illustrated in FIG. 25. For example, the mobile device 2300 may include a processor 2302 (e.g., a receiver device processor or mobile device processor) coupled to internal memories 2304 and 2310. Internal memories 2304 and 2310 may be volatile or non-volatile memories, and may also be secure and/or encrypted memories, or unsecure and/or unencrypted memories, or any combination thereof. The processor 2302 may also be coupled to a touch screen display 2306, such as a resistive-sensing touch screen, capacitive-sensing touch screen infrared sensing touch screen, or the like. Additionally, the display of the mobile device 2300 need not have touch screen capability. The mobile device 2300 may have one or more radio signal transceivers 2308 (e.g., Peanut®, Bluetooth®, Zigbee®, Wi-Fi, RF radio) and antennae 2311, for sending and receiving, coupled to each other and/or to the processor 2302. The mobile device 2300 may include a cellular network interface, such as wireless modem chip 2316, that enables communication via a cellular data network (e.g., CDMA, TDMA, GSM, PCS, 3G, 4G, LTE, or any other type of cellular data network) and is coupled to the processor 2302. The mobile device 2300 may include a peripheral device connection interface 2318 coupled to the processor 2302. The peripheral device connection interface 2318 may be singularly configured to accept one type of connection, or multiply configured to accept various types of physical and communication connections, common or proprietary, such as USB, FireWire, Thunderbolt, or PCIe. The peripheral device connection interface 2318 may also be coupled to a similarly configured peripheral device connection port. The mobile device 2300 may also include speakers 2314 for providing audio outputs. The mobile device 2300 may also include a housing 2320, constructed of a plastic, metal, or a combination of materials, for containing all or some of the components discussed herein. The mobile device 2300 may include a power source 2322 coupled to the processor 2302, such as a disposable or rechargeable battery. The rechargeable battery may also be coupled to the peripheral device connection port to receive a charging current from a source external to the mobile device 2300.

Figure 26:
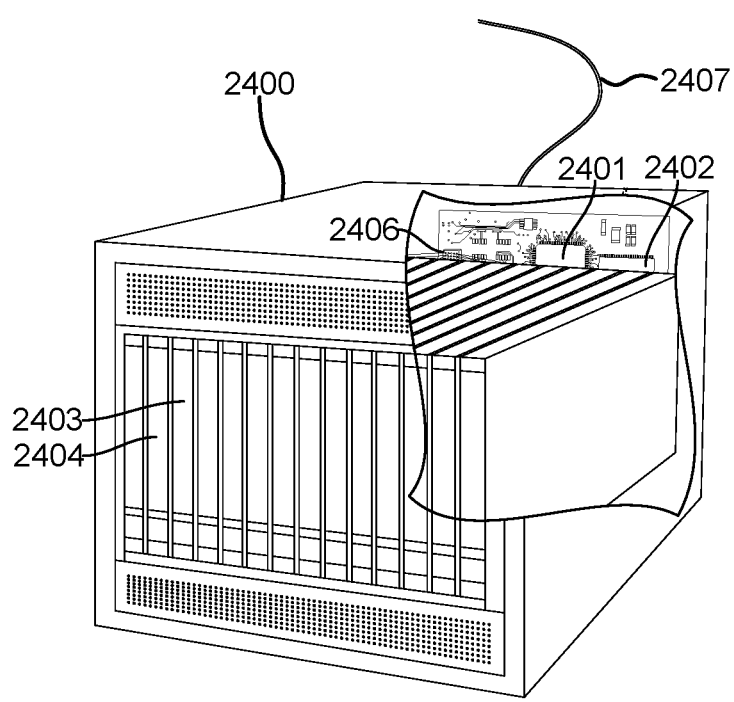
FIG. 26 is a component diagram of an example server suitable for use with the various embodiments.

The various embodiments may also be implemented on any of a variety of commercially available server devices, such as the server 2400 illustrated in FIG. 26. Such a server 2400 typically includes a processor 2401 (e.g., a server processor) coupled to volatile memory 2402 and a large capacity nonvolatile memory, such as a disk drive 2404. The server 2400 may also include a floppy disc drive, compact disc (CD) or DVD disc drive 2403 coupled to the processor 2401. The server 2400 may also include network access ports 2406 coupled to the processor 2401 for establishing network interface connections with a network 2407, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 2302 and 2401 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 2304, 2310, 2402, and 2404 before they are accessed and loaded into the processors 2302 and 2401. The processors 2302 and 2401 may include internal memory sufficient to store the application software instructions. In many devices the internal memory may be a volatile or nonvolatile memory, such as flash memory, or a mixture of both. For the purposes of this description, a general reference to memory refers to memory accessible by the processors 2302 and 2401 including internal memory or removable memory plugged into the device and memory within the processor 2302 and 2401 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or non-transitory processor-readable medium. Non-transitory computer-readable or non-transitory processor readable storage media may be any storage media that may be accessed by a computer or a processor that may have stored thereon computer-executable or processor-executable instructions. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for broadcasting a service in a cellular network, comprising:
   generating, in a server, a schedule for a service including two or more data streams comprising:
   a first data stream of the service scheduled to be broadcast in a first File Delivery Over Unidirectional Transport ("FLUTE") session; and
   a second data stream of the service scheduled to be broadcast in a second FLUTE session;
   identifying, in the server, one of the first FLUTE session or the second FLUTE session as a FLUTE session to exclusively carry all metadata fragments of the service via in-band delivery;
   generating, in the server, a diary file associated with the service, the diary file comprising:
   an indication of the service;
   an indication of a type of data in the first data stream;
   an indication of a type of data in the second data stream; and
   an indication of the identified FLUTE session that is to exclusively carry all metadata fragments associated with the service via in-band delivery;
   sending the diary file from the server to a receiver device;
   broadcasting the service in the first FLUTE session and the second FLUTE session in the cellular network according to the schedule; and
   broadcasting, via in-band delivery only in the indicated FLUTE session, one or more metadata fragments associated with the service.

2. The method of claim 1, wherein the diary file further comprises:
   an indication of the first FLUTE session;
   an indication of a session description for the first FLUTE session;
   an indication of the second FLUTE session; and
   an indication of a session description for the second FLUTE session.

3. The method of claim 1, wherein the one or more metadata fragments are one or more update fragments.

4. The method of claim 1, wherein the one or more metadata fragments are one or more associated delivery procedure description fragments, one or more schedule fragments, one or more filter descriptions, or one or more media presentation description fragments.

5. The method of claim 1, wherein the diary file is a user service description.

6. The method of claim 1, wherein the cellular network is established according to a 3rd Generation Partnership Projects ("3GPP") Technical Standard ("TS").

7. A method, comprising:
   receiving, at a receiver device, a diary file associated with a broadcast service, the service including two or more data streams comprising a first data stream of the service scheduled to be broadcast in a first File Delivery Over Unidirectional Transport ("FLUTE") session and a second data stream of the service scheduled to be broadcast in a second FLUTE session, the diary file comprising:
   an indication of the service;
   an indication of a type of data in the first data stream;
   an indication of a type of data in the second data stream; and
   an indication of a FLUTE session identified to exclusively carry all metadata fragments associated with the service via in-band delivery, the indicated FLUTE session comprising one of the first FLUTE session or the second FLUTE session;
   joining, at the receiver device, at least one of the first FLUTE session or the second FLUTE session to receive at least one of the first data stream or the second data stream;
   rendering, at the receiver device, the service by outputting at least one of the first data stream or the second data stream; and
   based on the indication of the FLUTE session identified to exclusively carry all metadata fragments associated with the service via in-band delivery, joining the indicated FLUTE session to receive one or more metadata fragments associated with the service.

8. The method of claim 7, wherein the diary file further comprises:
   an indication of the first FLUTE session;
   an indication of a session description for the first FLUTE session;
   an indication of the second FLUTE session; and
   an indication of a session description for the second FLUTE session.

9. The method of claim 7, wherein the one or more metadata fragments are one or more update fragments.

10. The method of claim 7, wherein the one or more metadata fragments are one or more associated delivery procedure description fragments, one or more schedule fragments, one or more filter descriptions, or one or more media presentation description fragments.

11. The method of claim 7, wherein the diary file is a user service description.

12. A server, comprising:
    a processor configured with processor-executable instructions to perform operations comprising:
    generating a schedule for a service including two or more data streams comprising:
    a first data stream of the service scheduled to be broadcast in a first File Delivery Over Unidirectional Transport ("FLUTE") session; and
    a second data stream of the service scheduled to be broadcast in a second FLUTE session;
    identifying one of the first FLUTE session or the second FLUTE session as a FLUTE session to exclusively carry all metadata fragments of the service via in-band delivery;
    generating a diary file associated with the service, the diary file comprising:
    an indication of the service;
    an indication of a type of data in the first data stream;
    an indication of a type of data in the second data stream; and
    an indication of the identified FLUTE session that is to exclusively carry all metadata fragments associated with the service via in-band delivery;
    sending the diary file from the server to a receiver device;
    broadcasting the service in the first FLUTE session and the second FLUTE session in the cellular network according to the schedule; and
    broadcasting, via in-band delivery only in the indicated FLUTE session, one or more metadata fragments associated with the service.

13. The server of claim 12, wherein the processor is configured with processor-executable instructions to perform operations such that the diary file further comprises:
an indication of the first FLUTE session;
an indication of a session description for the first FLUTE session;
an indication of the second FLUTE session; and
an indication of a session description for the second FLUTE session.

14. The server of claim 12, wherein the processor is configured with processor-executable instructions to perform operations such that the one or more metadata fragments are one or more update fragments.

15. The server of claim 12, wherein the processor is configured with processor-executable instructions to perform operations such that the one or more metadata fragments are one or more associated delivery procedure description fragments, one or more schedule fragments, one or more filter descriptions, or one or more media presentation description fragments.

16. The server of claim 12, wherein the processor is configured with processor-executable instructions to perform operations such that the diary file is a user service description.

17. The server of claim 12, wherein the cellular network is established according to a 3rd Generation Partnership Projects ("3GPP") Technical Standard ("TS").

18. A receiver device, comprising:
a processor configured with processor-executable instructions to perform operations comprising:
receiving a diary file associated with a broadcast service, the service including two or more data streams comprising a first data stream of the service scheduled to be broadcast in a first File Delivery Over Unidirectional Transport ("FLUTE") session and a second data stream of the service scheduled to be broadcast in a second FLUTE session, the diary file comprising:
an indication of the service;
an indication of a type of data in the first data stream;
an indication of a type of data in the second data stream; and
an indication of a FLUTE session identified to exclusively carry all metadata fragments associated with the service via in-band delivery, the indicated FLUTE session comprising one of the first FLUTE session or the second FLUTE session;
joining at least one of the first FLUTE session or the second FLUTE session to receive at least one of the first data stream or the second data stream;
rendering the service by outputting at least one of the first data stream or the second data stream; and
based on the indication of the FLUTE session identified to exclusively carry all metadata fragments associated with the service via in-band delivery, joining the indicated FLUTE session to receive one or more metadata fragments associated with the service.

19. The receiver device of claim 18, wherein the processor is configured with processor-executable instructions to perform operations such that the diary file further comprises:
an indication of the first FLUTE session;
an indication of a session description for the first FLUTE session;
an indication of the second FLUTE session; and
an indication of a session description for the second FLUTE session.

20. The receiver device of claim 18, wherein the processor is configured with processor-executable instructions to perform operations such that the one or more metadata fragments are one or more update fragments.

21. The receiver device of claim 18, wherein the processor is configured with processor-executable instructions to perform operations such that the one or more metadata fragments are one or more associated delivery procedure description fragments, one or more schedule fragments, one or more filter descriptions, or one or more media presentation description fragments.

22. The receiver device of claim 18, wherein the processor is configured with processor-executable instructions to perform operations such that the diary file is a user service description.

* * * * *